US008576692B2

(12) United States Patent
Zhang et al.

(10) Patent No.: US 8,576,692 B2
(45) Date of Patent: Nov. 5, 2013

(54) TRANSMISSION OF UE-SPECIFIC REFERENCE SIGNAL FOR WIRELESS COMMUNICATION

(75) Inventors: Xiaoxia Zhang, San Diego, CA (US); Yongbin Wei, San Diego, CA (US); Tao Luo, San Diego, CA (US); Dung Ngoc Doan, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 12/878,983

(22) Filed: Sep. 9, 2010

(65) Prior Publication Data

US 2011/0216842 A1   Sep. 8, 2011

Related U.S. Application Data

(60) Provisional application No. 61/241,279, filed on Sep. 10, 2009.

(51) Int. Cl.
*H04J 11/00* (2006.01)
(52) U.S. Cl.
USPC .............................. 370/208; 370/210; 370/437
(58) Field of Classification Search
None
See application file for complete search history.

(56) References Cited

U.S. PATENT DOCUMENTS

| 2010/0291936 | A1* | 11/2010 | Zangi et al. ................... 455/450 |
| 2011/0176502 | A1* | 7/2011 | Chung et al. ................... 370/329 |
| 2011/0299625 | A1* | 12/2011 | Hooli et al. ................... 375/295 |
| 2012/0106473 | A1* | 5/2012 | Tiirola et al. ................... 370/329 |
| 2012/0113950 | A1* | 5/2012 | Skov et al. ................... 370/329 |

OTHER PUBLICATIONS

Alcatel-Lucent Shanghai Bell, et al., "Multi-cell cooperative RS in CoMP", 3GPP Draft, R1-092158 DL RS for Comp, 3rd Generation Partnership Project (3GPP), Mobile Competence Centre, 650, Route Des Lucioles, F-06921 Sophia-Antipolis Cedex, France, no. San Francisco, USA, 20090428, Apr. 28, 2009, XP050339598, [retrieved on Apr. 28, 2009].
International Search Report and Written Opinion—PCT/US2010/048519—ISA/EPO—Apr. 18, 2011.
Nokia, et al., "Further considerations on UE-specific reference symbol multiplexing for LTE-Advanced downlink", 3GPP Draft, R1-091757, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339282, [retrieved on Apr. 28, 2009].

(Continued)

*Primary Examiner* — Bob Phunkulh

(57) ABSTRACT

Techniques for transmitting UE-specific reference signals (UE-RSs) in a wireless network are described. In an aspect, a UE-RS may be transmitted in different manners depending on the number of layers used for data transmission. In one design, a cell may determine subcarriers for a UE-RS based on a frequency shift if data is transmitted on one layer and based on a predetermined set of subcarriers (with no frequency shift) if data is transmitted on multiple layers. In another aspect, a UE-RS may be transmitted on subcarriers determined based on a frequency shift for data transmission on multiple layers. In yet another aspect, a UE-RS may be transmitted from a plurality of cells to a UE for coordinated multi-point (CoMP). In yet another aspect, a UE-RS may be transmitted in a data section of a subframe including only the data section.

76 Claims, 16 Drawing Sheets

(56) References Cited

OTHER PUBLICATIONS

Panasonic: "Component carrier operation without PDCCH", 3GPP Draft, R1-093466, 3rd Generation Partnership Project (3GPP), Mobile Competence Centre, 650, Route Des Lucioles, F-06921 Sophia-Antipolis Cedex, France, no. Shenzhen, China, Aug. 18, 2009, XP050351736, [retrieved on Aug. 18, 2009].

Panasonic: "Component carrier types in LTE-A", 3GPP Draft, R2-095312 Component Carrier Types, 3rd Generation Partnership Project (3GPP), Mobile Competence Centre, 650, Route Des Lucioles, F-06921 Sophia-Antipolis Cedex, France, no. Shenzhen, China, Aug. 24, 2009, XP050389780, [retrieved on Aug. 27, 2009].

Panasonic: "Downlink DM-RS with inter-cell considerations", 3GPP Draft, R1092526, 3rd Generation Partnership Project (3GPP), Mobile Competence Centre, 650, Route Des Lucioles, F-06921 Sophia-Antipolis Cedex, France, no. Los Angeles, USA, Jun. 23, 2009, XP050351032, [retrieved on Jun. 23, 2009].

Research in Motion, et al., "Downlink DM-RS Design Considerations for LTE-A", 3GPP Draft, R1-093283(RIM-DL_DM-RS), 3rd Generation Partnership Project (3GPP), Mobile Competence Centre, 650, Route Des Lucioles, F-06921 Sophia-Antipolis Cedex, France, no. Shenzhen, China, Aug. 18, 2009, XP050351609, [retrieved on Aug. 18, 2009].

Lg Electronics: "Issues on Dl-Rs Design for Lte-A" 3GPP Draft; R1-090787, 3RD Generation Partnership Project (3GPP), Mobile Competence Centre ; 650, Route Des Lucioles ; F-06921 Sophia-Antipolis Cedex ; France, no. Athens, Greece; 20090203, 3 Feb. 2009 (2009-02-03), XP050318644 [retrieved on 2009-02-03] p. 1, line 7 - line 9 p. 2, line 5 - line 19 p. 3, line 6 - line 16 p. 3, line 29 - line 36.

Qualcomm Europe: "Rs Structure in Support of Higher-order Mimo", 3GPP Draft, R1091450 Dl-Rs, 3RD Generation Partnership Project (3GPP), Mobile Competence Centre, 650, Route Des Lucioles, F-06921 Sophia-Antipolis Cedex, France, no. Seoul, Korea, 20090318, 18 Mar. 2009 (2009-03-18), XP050339020, [retrieved on 2009-03-18].

* cited by examiner

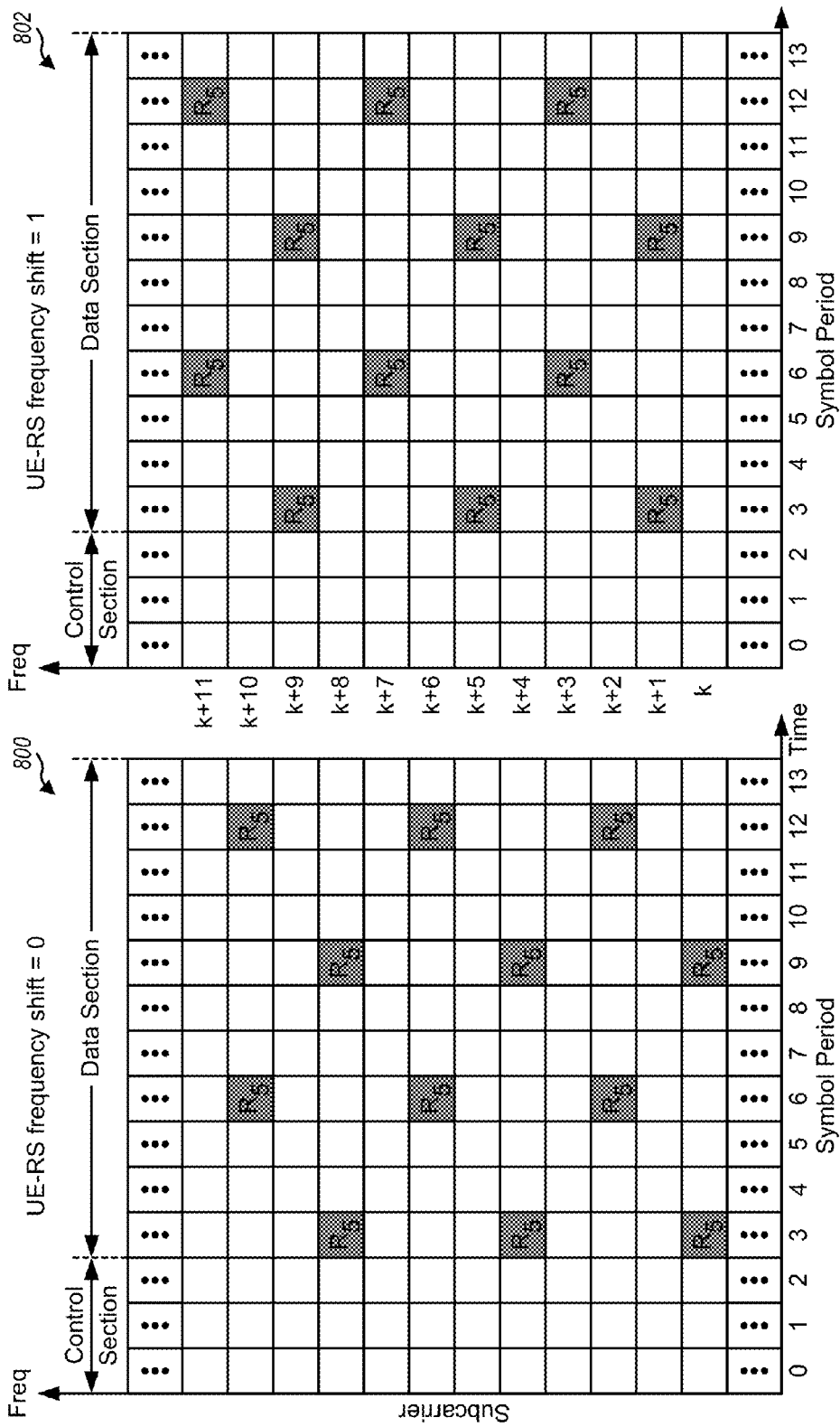

TRANSMISSION OF UE-SPECIFIC REFERENCE SIGNAL FOR WIRELESS COMMUNICATION

The present application claims priority to provisional U.S. Application Ser. No. 61/241,279, entitled "A METHOD AND APPARATUS FOR USER EQUIPMENT REFERENCE SIGNAL PROCESSING IN A WIRELESS COMMUNICATION SYSTEM," filed Sep. 10, 2009, assigned to the assignee hereof and incorporated herein by reference.

BACKGROUND

I. Field

The present disclosure relates generally to communication, and more specifically to techniques for transmitting and receiving reference signals in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user equipments (UEs). A cell may refer to a base station and/or a coverage area of the base station, depending on the context in which the term is used. A UE may communicate with a cell via the downlink and uplink. The downlink (or forward link) refers to the communication link from the cell to the UE, and the uplink (or reverse link) refers to the communication link from the UE to the cell. The cell may transmit a reference signal and data to the UE. The reference signal may be used for channel estimation and/or other purposes.

SUMMARY

Techniques for transmitting and receiving UE-specific reference signals (UE-RSs) in a wireless network are described herein. A UE-RS is a reference signal or pilot that is sent to a specific UE. In an aspect, a UE-RS may be transmitted in different manners depending on the number of layers (or antenna ports) used for data transmission. In one design, a cell may determine whether to transmit data on one layer or multiple layers. The cell may determine subcarriers for a UE-RS based on a frequency shift if data is transmitted on one layer and based on a predetermined set of subcarriers (with no frequency shift) if data is transmitted on multiple layers. Frequency shift refers to a frequency offset used to determine subcarriers for transmitting a UE-RS. The frequency shift may be determined by a cell identity (ID) or defined in other manners. In one design, the cell may select a set of subcarriers for the UE-RS, from among a plurality of possible sets of subcarriers, based on the frequency shift if data is transmitted on one layer. The cell may select the predetermined set of subcarriers (i.e., not based on the frequency shift) for the UE-RS if data is transmitted on multiple layers. The cell may transmit the UE-RS on the determined subcarriers. The cell may also transmit data on one layer or multiple layers, as determined earlier.

In another aspect, a UE-RS may be transmitted on subcarriers determined based on a frequency shift for data transmission on multiple layers. In one design, a cell may determine subcarriers for a plurality of UE-RSs based on a frequency shift. The cell may transmit the plurality of UE-RSs on the determined subcarriers on a plurality of layers to at least one UE, e.g., one UE-RS on each layer. The cell may also transmit data on the plurality of layers to the at least one UE.

In yet another aspect, a UE-RS may be transmitted for coordinated multi-point (CoMP). In one design, a cell may determine subcarriers for a UE-RS transmitted by a plurality of cells to a UE for CoMP, with the cell being one of the plurality of cells. The subcarriers for the UE-RS may be fixed designated subcarriers or may be determined based on a frequency shift. The cell may transmit the UE-RS on the determined subcarriers to the UE.

In yet another aspect, a UE-RS may be transmitted in different types of subframe. In one design, a cell may select a subframe from among a plurality of subframes including first and second subframes. The first subframe may include a data section and a control section, and the second subframe may include only the data section. In one design, the first subframe may be selected for communication on a carrier in which control information is sent, and the second subframe may be selected for communication on a carrier in which control information is not sent. The cell may transmit a UE-RS in only the data section of the selected subframe.

A UE may perform the complementary processing to receive a UE-RS transmitted by one or more cells to the UE. Various aspects and features of the disclosure are described in further detail below.

BRIEF DESCRIPTION OF THE DRAWINGS

FIGS. 8A, 8B and 8C show three UE-RS patterns for one layer or antenna port with different frequency shifts.

FIG. 9 shows a UE-RS pattern for two antenna ports without frequency shift.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
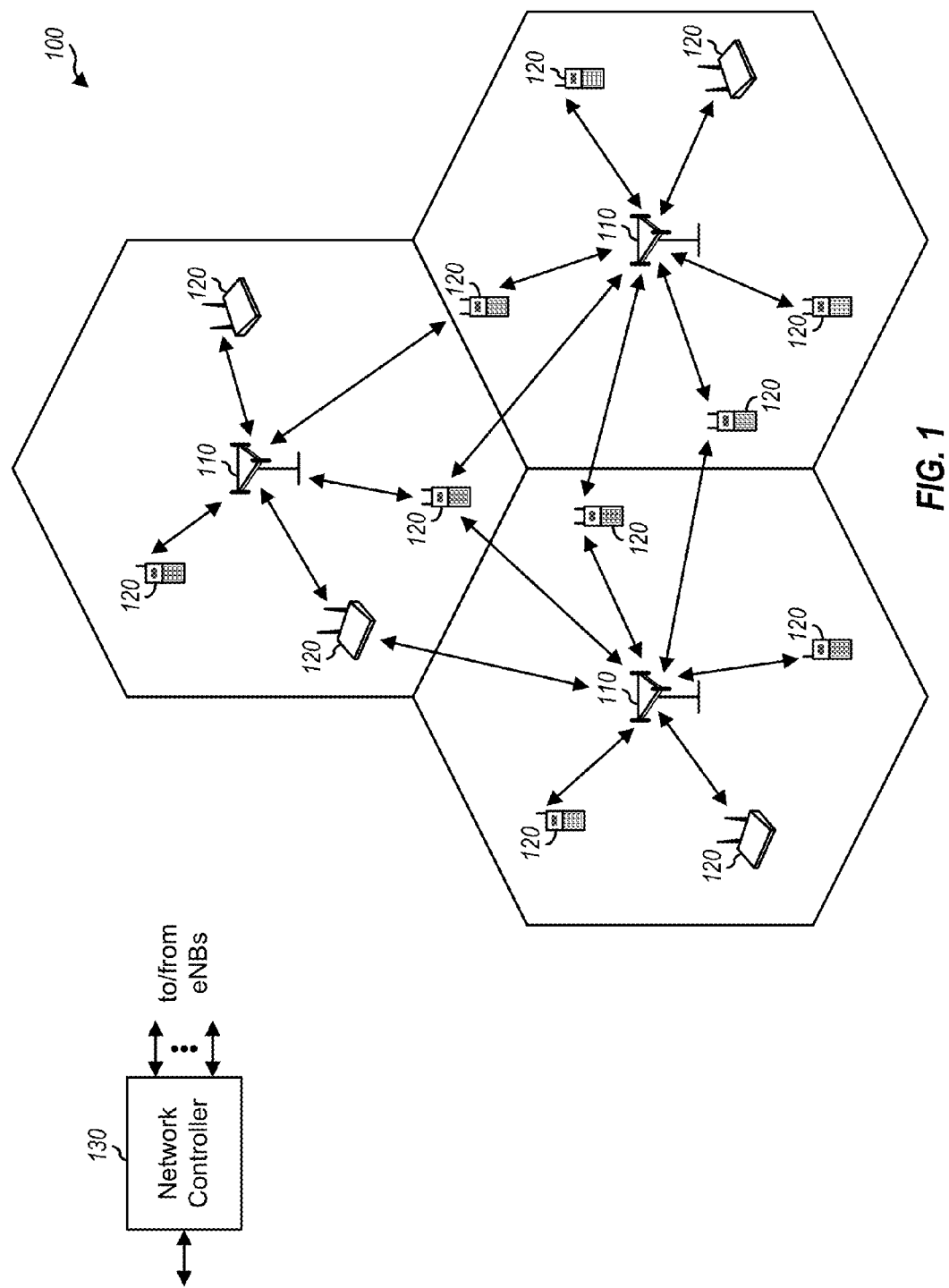
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description herein. An eNB may support one or multiple (e.g., three) cells.

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

A set of transmission modes may be supported for data transmission on the downlink. Each transmission mode may define a specific manner in which a cell may transmit data and reference signals to one or more UEs on a given time-frequency resource, which may include one or more resource blocks. Table 1 lists some transmission modes that may be supported and provides a brief description of each transmission mode. Other transmission modes may also be supported for data transmission on the downlink.

TABLE 1

| Mode | Description |
| --- | --- |
| Beamsteering | A cell transmits a single data stream to a UE on a given time-frequency resource with precoding. |
| Multiple-input multiple-output (MIMO) | A cell transmits multiple data streams to one or more UEs on a given time-frequency resource. |
| Coordinated multi-point (COMP) | Multiple cells transmit one or more data streams to one or more UEs on a given time-frequency resource. |

The beamsteering mode may support transmission of one data stream from a cell to a UE with beamsteering. Beamsteering is a process to control the spatial direction of a transmission toward a target UE and/or away from an unintended UE. Beamsteering may be achieved by performing precoding with a precoding vector at a cell, as follows:

$$x(k, n) = ps(k, n), \qquad \text{Eq (1)}$$

where $s(k,n)$ is a modulation symbol to transmit on subcarrier k in symbol period n,
  p is a T×1 precoding vector, where T is the number of transmit antennas, and
  $x(k,n)$ is a T×1 vector of output symbols to transmit from the T transmit antennas on subcarrier k in symbol period n.

The MIMO mode may support single-user MIMO (SU-MIMO) and/or multi-user MIMO (MU-MIMO). For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding.

The CoMP mode may support cooperative transmission and/or joint processing. For cooperative transmission, multiple cells may transmit one or more data streams to a single UE on a given time-frequency resource such that data transmission is steered toward the UE and/or away from one or more interfered UEs. For joint processing, multiple cells may transmit multiple data streams to multiple UEs (e.g., one data stream to each UE) on the same time-frequency resource with or without precoding.

Figure 2:
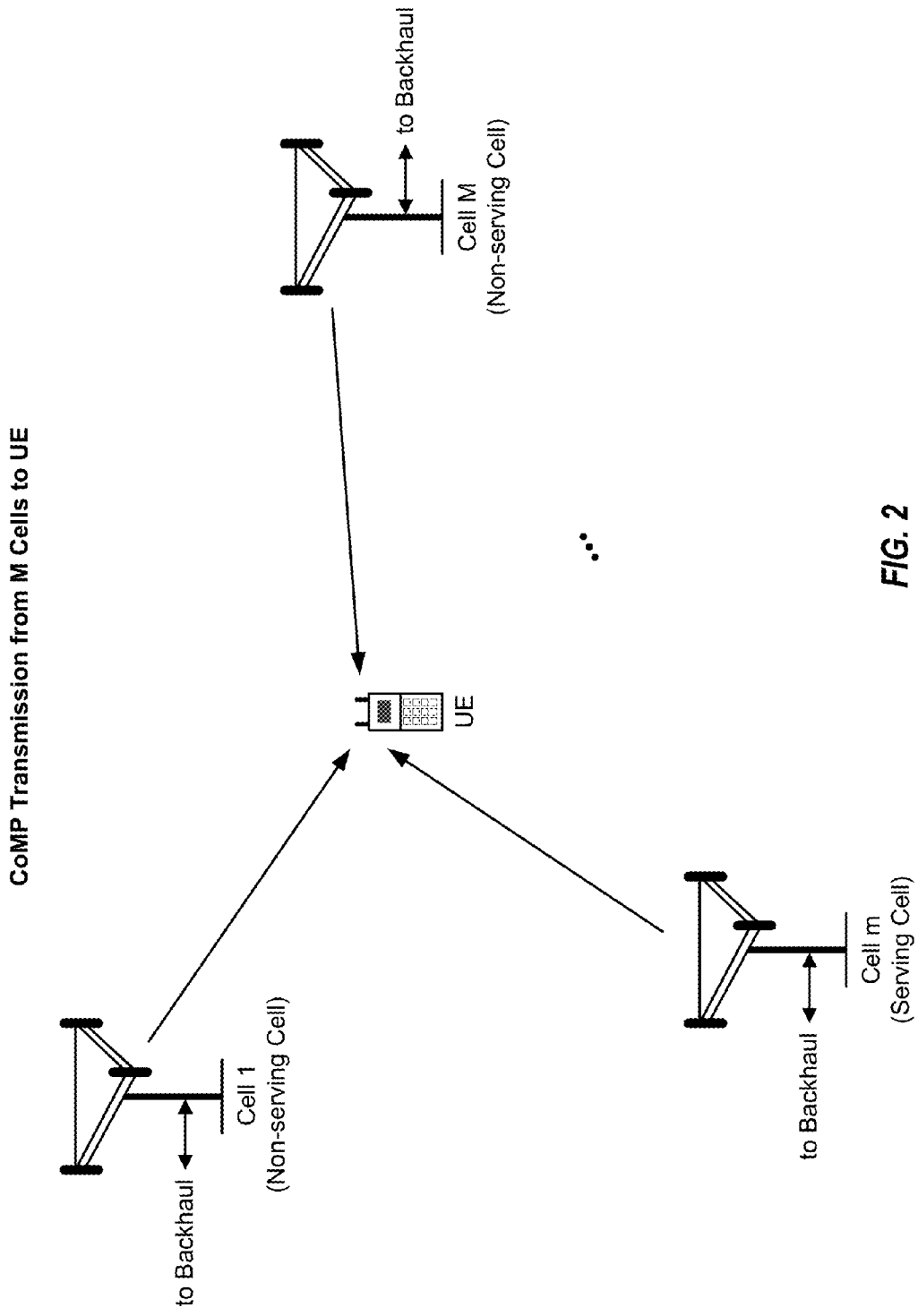
FIG. 2 shows CoMP transmission from multiple cells to a single UE.

FIG. 2 shows an example of CoMP transmission from multiple cells to a single UE. A measurement set may be maintained for a UE operating in the CoMP mode. The measurement set may include all cells that can transmit data to the UE. The cells in the measurement set may belong to the same eNB or different eNBs. All or a subset of the cells in the measurement set may transmit data to the UE at any given time, and the cells transmitting to the UE are included in a CoMP set for the UE. In the example shown in FIG. 2, the CoMP set includes M cells, where M may be any value greater than one. One cell in the CoMP set may be designated as a serving cell for the UE and may coordinate CoMP transmission to the UE. The other cell(s) in the CoMP set may be referred to as non-serving cell(s). The cells in the CoMP set may communicate with one another directly via the backhaul or indirectly via a network entity (e.g., network controller 130 in FIG. 1) to coordinate transmission of data and UE-RS to the UE. CoMP may be used to improve the performance of cell-edge UEs located at the boundary of cells.

In general, one or more data streams may be transmitted on one or more layers to one or more UEs on a given time-frequency resource. A layer may be viewed as a spatial channel that may be used for data transmission. For simplicity, the following description assumes that one data stream may be transmitted on one layer to one UE. A data stream may carry a packet or transport block in one transmission time interval (TTI), which may be one subframe in LTE. Each layer may be associated with one antenna port that may be used to transmit data. An antenna port may correspond to a physical antenna or a virtual antenna formed by a set of physical antennas. The terms "layer", "antenna port", and "data stream" may be used interchangeably. The beamforming mode may support data transmission on a single layer (or from one antenna port) to a single UE. The MIMO mode may support data transmission on multiple layers (or from multiple antenna ports) to one or more UEs. The CoMP mode may support data transmission on one or more layers (or from one or more antenna ports) to one or more UEs.

Figure 3:
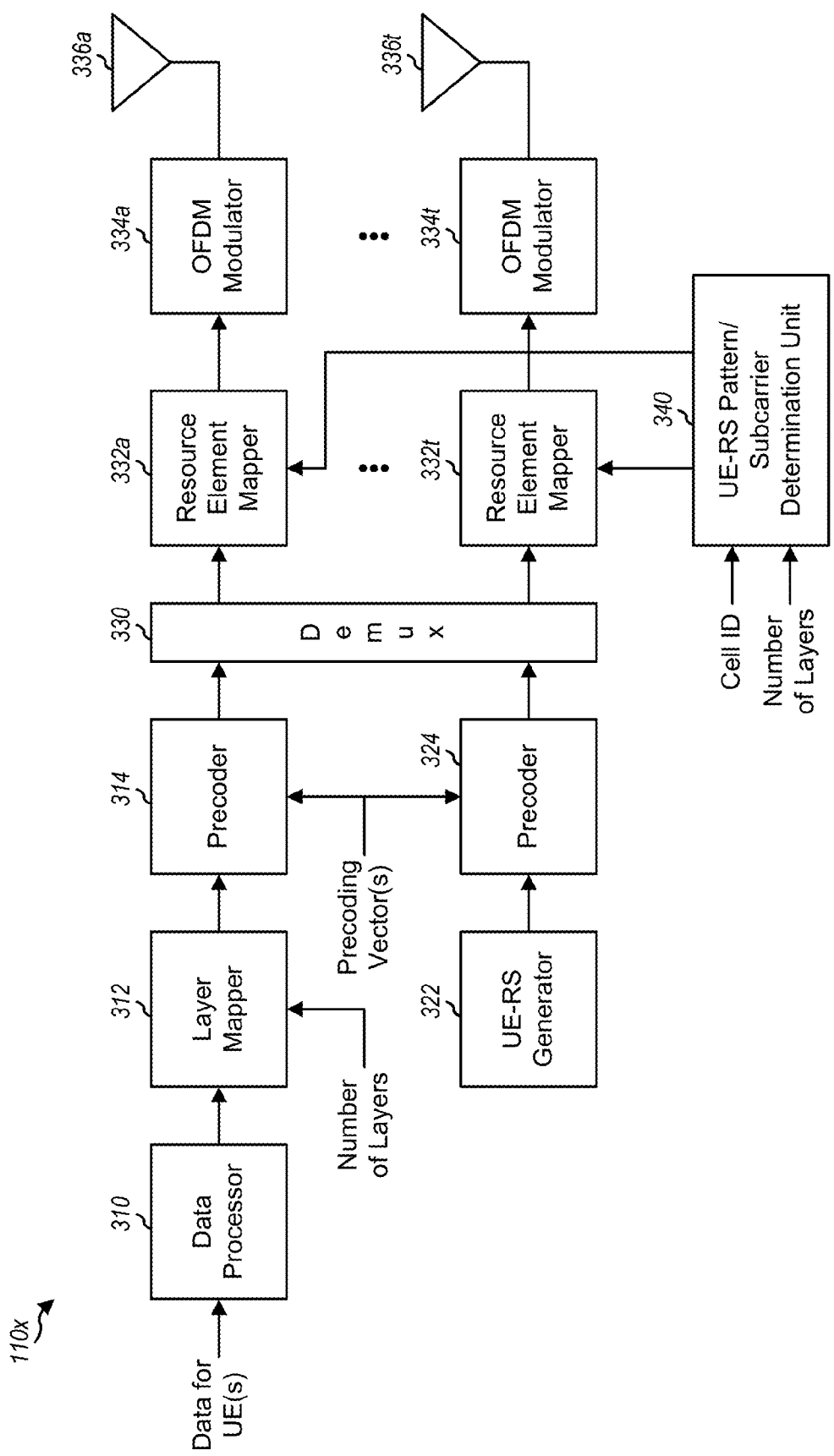
FIG. 3 shows a block diagram of a base station.

FIG. 3 shows a block diagram of a design of an eNB 110x, which may be one of the eNBs in FIG. 1. FIG. 3 shows the processing for one cell supported by eNB 110x. Within eNB 110x, a data processor 310 may receive data for one or more UEs, process the data for each UE based on one or more modulation and coding schemes selected for that UE, and provide data modulation symbols (or data symbols) for all UEs. A layer mapper 312 may map the data symbols for all UEs to one or more layers selected for use. In one design, data for each UE may be sent on at least one layer. For example, data for a single UE may be sent on one or two layers. As another example, data for two UEs may be sent on two layers, one layer for each UE. A precoder 314 may perform precoding for the data symbols for all layers selected for use based on a precoding vector for each layer and may provide precoded data symbols for T antennas at eNB 110x. The precoding vector for each layer may cause data to be transmitted via all or a subset of the T transmit antennas at eNB 110x.

A UE-RS generator 322 may generate reference symbols for a UE-RS for each layer selected for use. A precoder 324 may perform precoding for the reference symbols for all UE-RSs for all layers selected for use based on the precoding vector for each layer and may provide precoded reference symbols for all T transmit antennas at eNB 110x.

A demultiplexer (Demux) 330 may receive the precoded data symbols from precoder 314 and the precoded reference symbols from precoder 324. Demultiplexer 330 may provide the precoded data symbols and precoded reference symbols for the T transmit antennas to T resource element mappers 332a through 332t. Each resource element mapper 332 may map the precoded data symbols to resource elements used for data, map the precoded reference symbols to resource elements used for the UE-RSs, and provide the mapped symbols to an associated orthogonal frequency division multiplexing (OFDM) modulator 334. Each modulator 334 may generate OFDM symbols based on the mapped symbols from an associated resource element mapper 332. The OFDM symbols from OFDM modulators 334a through 334t may be transmitted via T antennas 336a through 336t, respectively.

A unit 340 may determine the subcarriers or resource elements to use for the UE-RSs. Unit 340 may receive inputs such as the number of layers used for data transmission, a cell identity (ID) of a cell served by eNB 110x, etc. Unit 340 may determine the subcarriers or resource elements to use for the UE-RSs based on the inputs and may provide this information to each resource element mapper 332. Each resource element mapper 332 may map the precoded data symbols and the precoded reference symbols to appropriate resource elements based on the information from unit 340. The operation of unit 340 is described in detail below.

Figure 4:
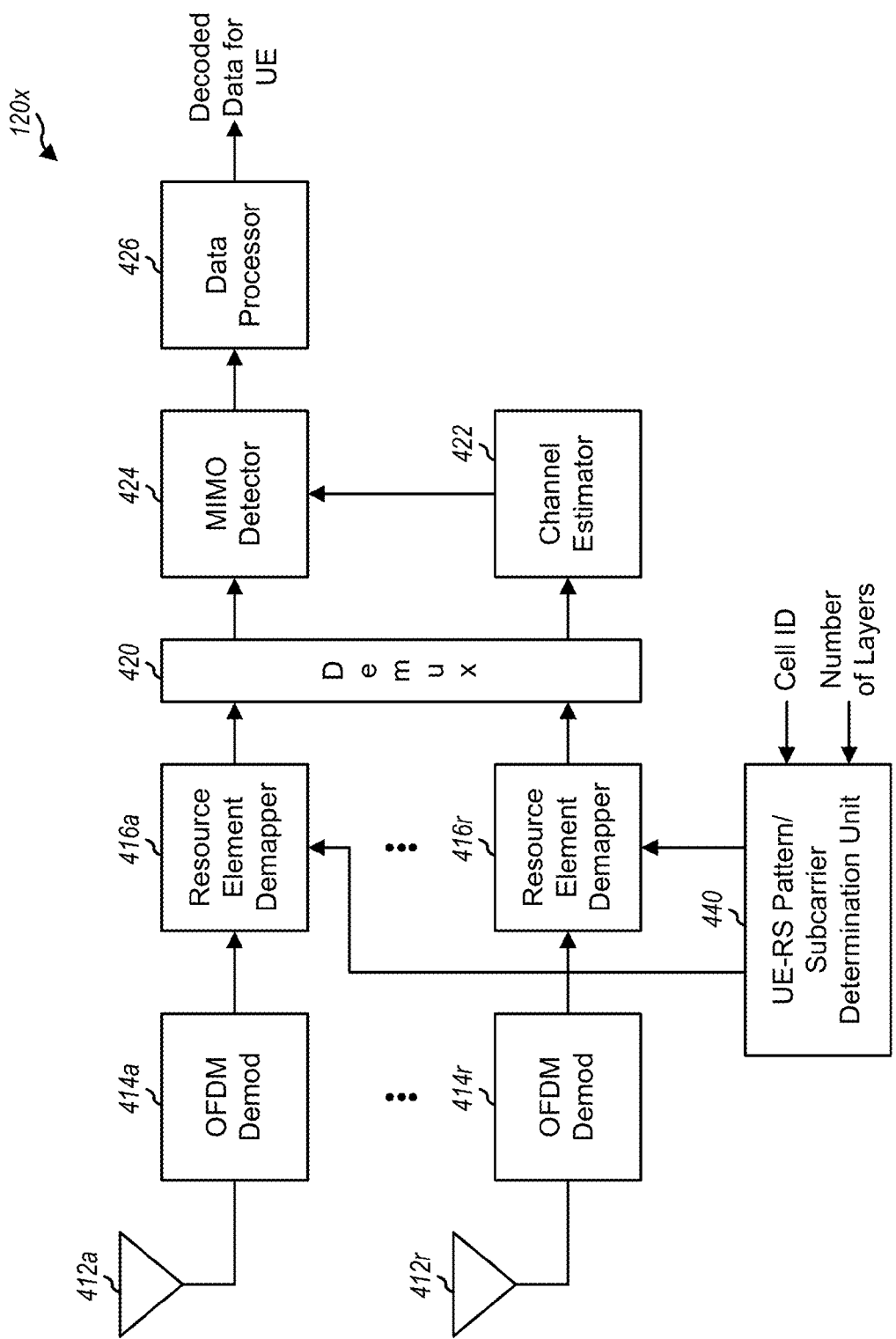
FIG. 4 shows a block diagram of a UE.

FIG. 4 shows a block diagram of a design of a UE 120x, which may be one of the UEs in FIG. 1. Within UE 120x, R receive antennas 412a through 412r may receive the downlink transmission from eNB 110x, and each antenna 412 may provide a received signal to an associated OFDM demodulator (Demod) 414. Each OFDM demodulator 414 may perform OFDM demodulation on its received signal and, for each received OFDM symbol, provide received symbols for all subcarriers used downlink transmission. R resource element demappers 416a through 416r may obtain received symbols from R OFDM demodulators 414a through 414r, respectively. Each resource element demapper 416 may perform demapping of the received symbols, provide received data symbols from resource elements used for data transmission, and provide received reference symbols from resource elements used for the UE-RSs. A demultiplexer 420 may obtain the received data symbols and the received reference symbols from all R resource element demappers 416a through 416r, provide the received reference symbols from all demappers 416 to a channel estimator 422, and provide the received data symbols from all demappers 416 to a MIMO detector 424. Channel estimator 422 may derive a channel estimate for each layer used for UE 120x based on the received reference symbols. MIMO detector 424 may perform MIMO detection on the received data symbols based on the channel estimates for all layers used for UE 120x and may provide detected symbols. A data processor 426 may process the detected symbols based on one or more modulation and coding schemes selected for UE 120x and may provide decoded data for UE 120x.

A unit 440 may determine the subcarriers or resource elements used for the UE-RSs. Unit 440 may receive inputs such as the number of layers used for data transmission, a cell ID of a serving cell, etc. Unit 440 may determine the subcarriers or resource elements to use for the UE-RSs based on the inputs and may provide this information to each resource element demapper 416. Each resource element demapper 416 may demap the received data symbols and the received reference symbols from appropriate resource elements based on the information from unit 440.

FIGS. 3 and 4 show exemplary designs of eNB 110x and UE 120x. eNB 110x and UE 120x may also be implemented in other manners.

Figure 5:
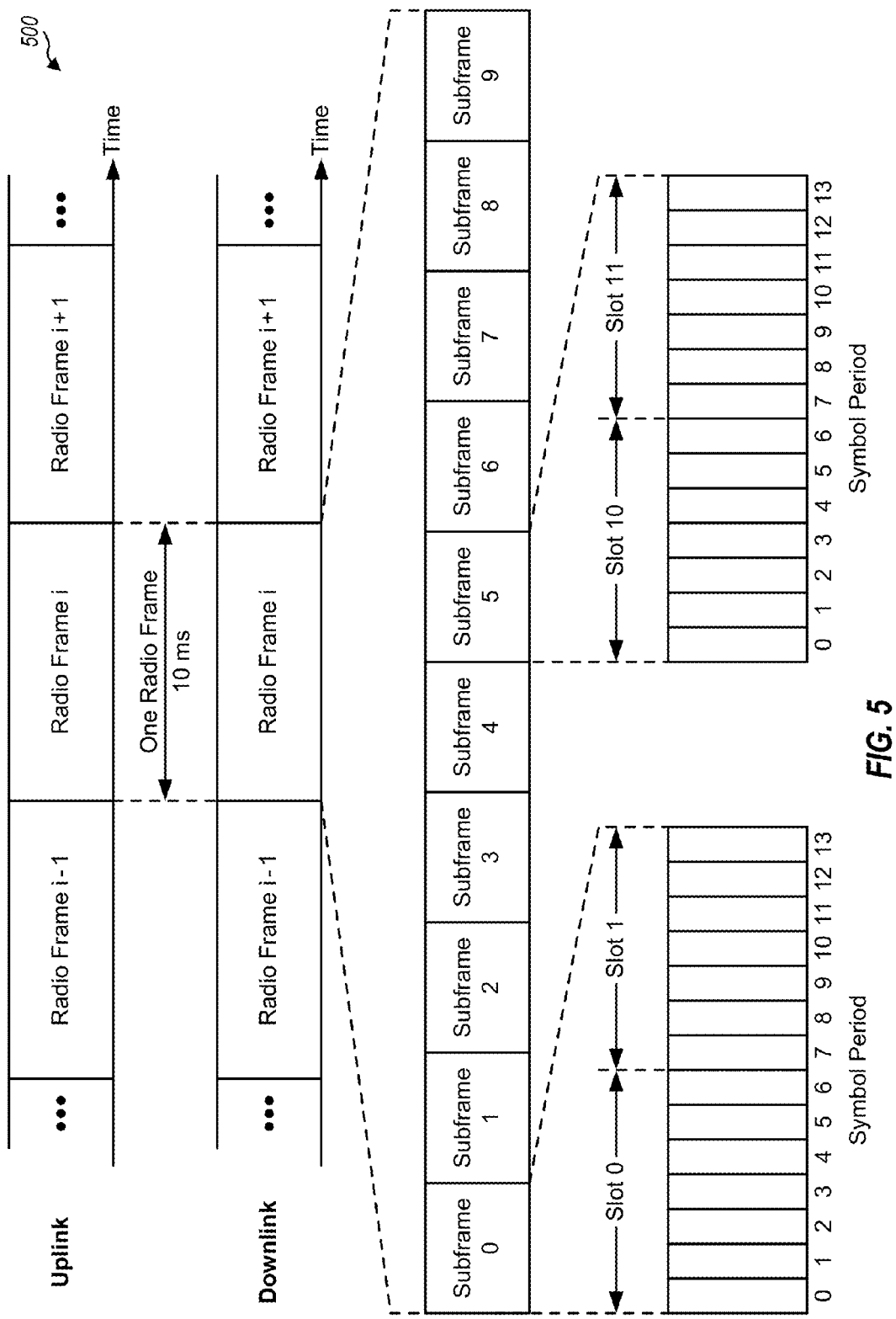
FIG. 5 shows an exemplary frame structure.

FIG. 5 shows a frame structure 500 used for frequency division duplexing (FDD) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 5) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

For each of the downlink and uplink, a number of resource blocks may be defined in each slot with the $N_{FFT}$ total subcarriers. The number of resource blocks in each slot may be dependent on the system bandwidth and may range from 6 to 110 for system bandwidth of 1.25 to 20 MHz. Each resource block may cover 12 subcarriers in one slot and may include a number of resource elements. Each resource element may cover one subcarrier in one symbol period and may be used to send one modulation symbol, which may be a real or complex value.

LTE supports several subframe formats for the downlink. Each subframe format may be associated with certain characteristics, e.g., certain signals and channels being sent in a subframe of that format and/or a specific way in which a signal or channel is sent in the subframe. Subframes of different formats may be used for different purposes.

Figure 6:
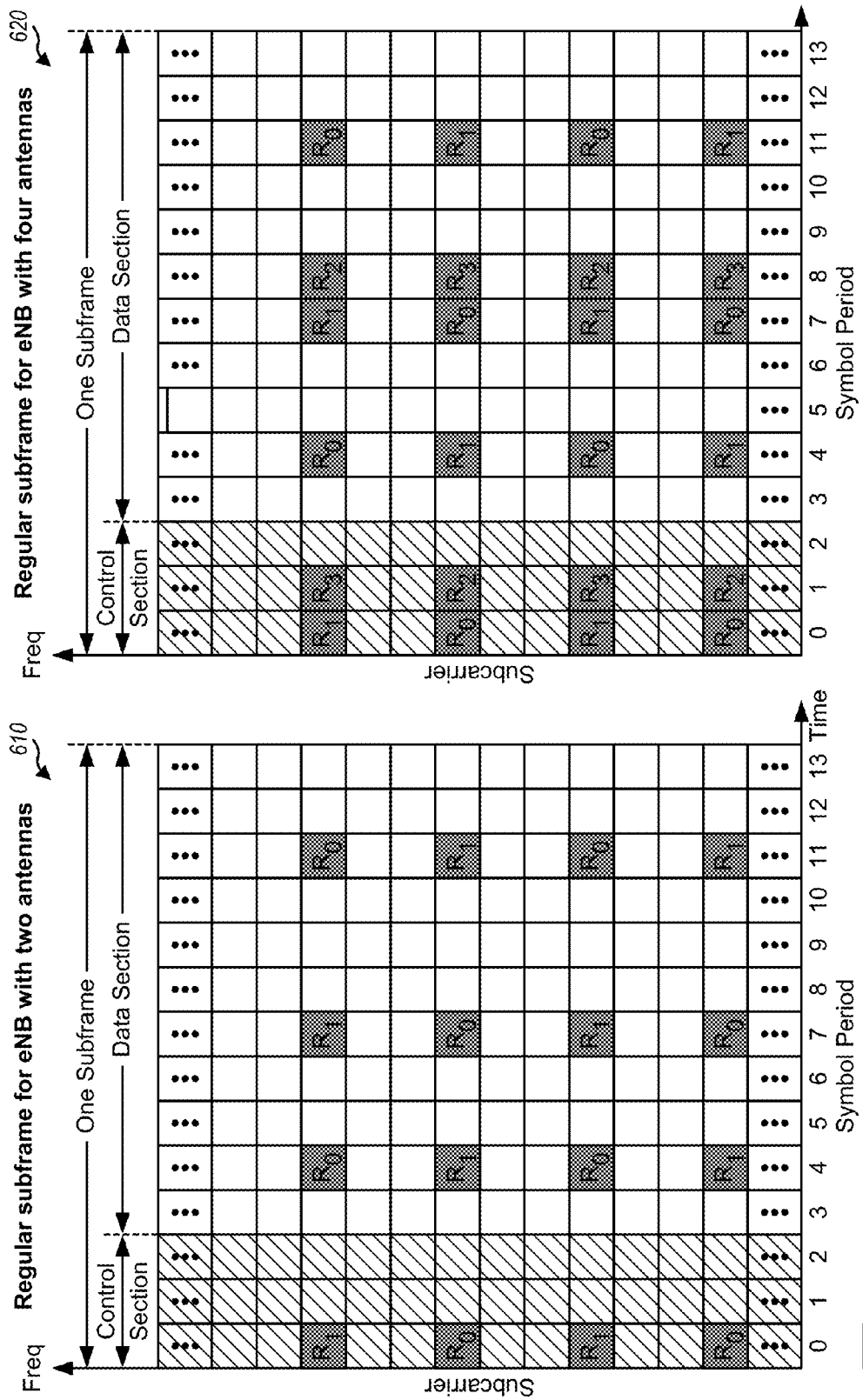
FIG. 6 shows two regular subframe formats.

FIG. 6 shows two regular subframe formats 610 and 620 that may be used for the downlink in LTE. For the normal cyclic prefix shown in FIG. 6, the left slot includes seven symbol periods 0 through 6, and the right slot includes seven symbol periods 7 through 13.

Subframe format 610 may be used by an eNB equipped with two antenna ports. A cell-specific reference signal (CRS) may be transmitted from antenna ports 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell ID. In FIG. 6, for a given resource element with label $R_p$, a modulation symbol may be transmitted on that resource element from antenna port p, and no modulation symbols may be transmitted on that resource element from other antenna ports. Subframe format 620 may be used for an eNB equipped with four antenna ports. A CRS may be transmitted from antenna ports 0 and 1 in symbol periods 0, 4, 7 and 11 and from antenna ports 2 and 3 in symbol periods 1 and 8. In one design, antenna ports 0, 1, 2 and 3 used for the CRS may correspond to physical antennas at the eNB. In another design, antenna ports 0, 1, 2 and 3 used for the CRS may correspond to virtual antennas or layers at the eNB.

As shown in FIG. 6, a cell may transmit the CRS on every third subcarrier in some symbol periods of a subframe. To mitigate interference between the CRSs from different cells, each cell may transmit its CRS on a set of subcarriers determined based on a cell ID of that cell. In particular, a cell-specific frequency shift may be determined for a cell as follows:

$$v_{shift=NID}{}^{cell} \bmod 3, \qquad \text{Eq (2)}$$

where $N_{ID}{}^{cell}$ is the cell ID of the cell, and $v_{shift}$ is a frequency shift for the cell.

The subcarriers used for the CRS may be determined based on a function of the frequency shift. Different cells with different cell IDs may be associated with different frequency shifts and may then transmit their CRSs on different subcarriers. These cells may avoid collision of their CRSs. A subcarrier used for a reference signal may be referred to as a RS subcarrier or a RS tone. A resource element used for a reference signal may be referred to as a RS resource element.

For both subframe formats 610 and 620, a subframe may include a control section followed by a data section. The control section may include the first Q symbol periods of the subframe, where Q may be equal to 1, 2, 3 or 4. Q may change from subframe to subframe and may be conveyed in the first symbol period of the subframe. The control section may carry various control channels such as (i) a Physical Control Format Indicator Channel (PCFICH) conveying the size of the control section (i.e., the value of Q), (ii) a Physical Hybrid ARQ Indicator Channel (PHICH) carrying acknowledgement (ACK) information for data transmission sent by UEs on the uplink, and (iii) a Physical Downlink Control Channel (PDCCH) carrying downlink control information for UEs. The data section may include the remaining 2L−Q symbol periods of the subframe and may carry a Physical Downlink Shared Channel (PDSCH) carrying data and/or other information for UEs.

Figure 7:
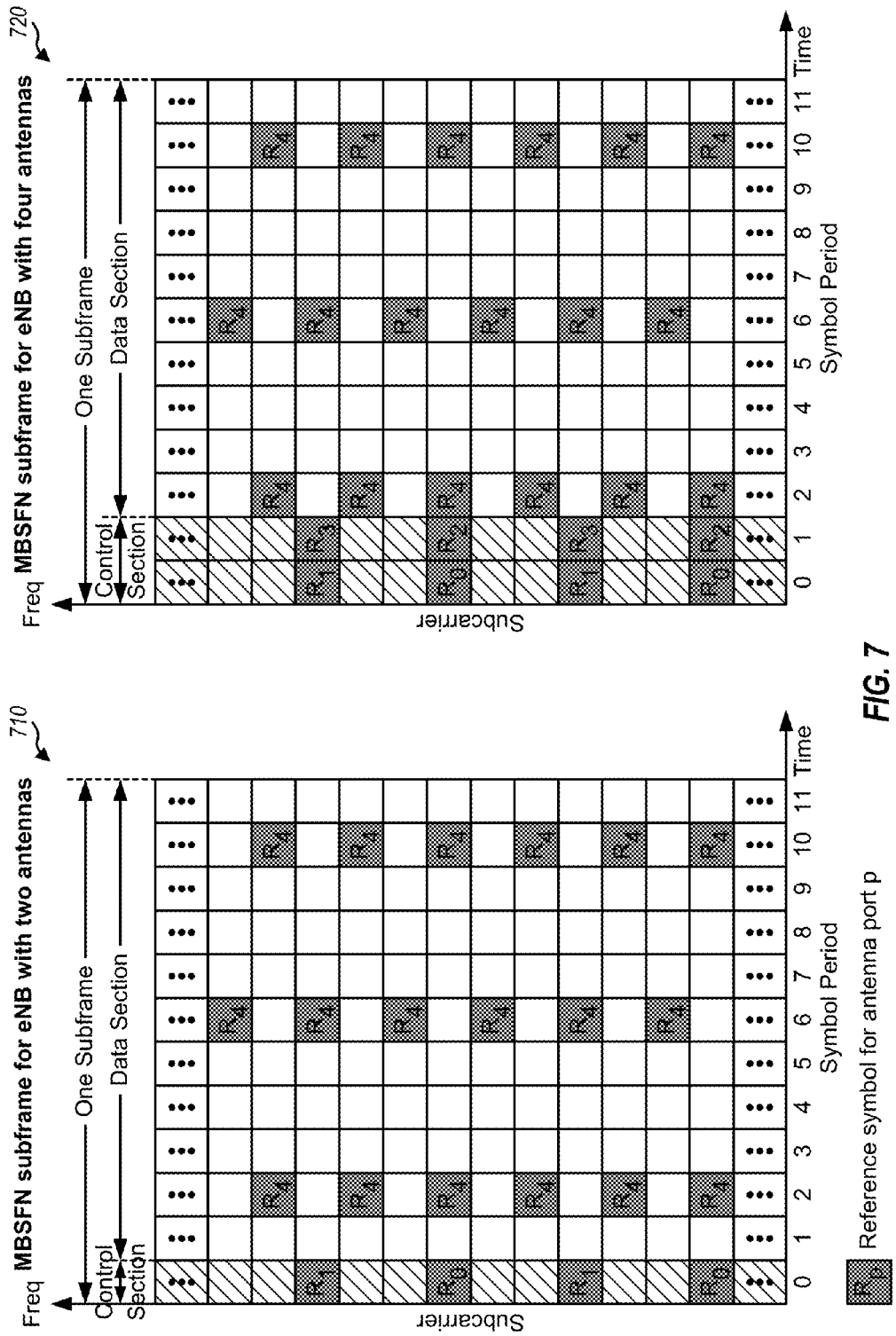
FIG. 7 shows two multicast/broadcast single frequency network (MBSFN) subframe formats.

FIG. 7 shows two MBSFN subframe formats 710 and 720 that may be used for the downlink in LTE. MBSFN subframes may be used to send single frequency network (SFN) transmissions for multimedia broadcast/multicast services (MBMS). MBSFN subframes may also be used to support other features, e.g., relay communication, peer-to-peer communication, machine communication, etc. For the extended cyclic prefix shown in FIG. 7, the left slot includes six symbol periods 0 through 5, and the right slot includes six symbol periods 6 through 11.

Subframe format 710 may be used by an eNB equipped with two antenna ports. A CRS may be transmitted from antenna ports 0 and 1 in symbol period 0. In the example shown in FIG. 7, Q=1 for the left subframe in FIG. 7, and the control section covers one symbol period. Subframe format 720 may be used by an eNB equipped with four antenna ports. A CRS may be transmitted from antenna ports 0 and 1 in symbol period 0 and from antenna ports 2 and 3 in symbol period 1. In the example shown in FIG. 7, Q=2 for the right subframe in FIG. 7, and the control section covers two symbol periods. For both subframe formats 710 and 720, a MBMS reference signal (MBMS-RS) may be transmitted from antenna port 4 in symbol periods 2, 6, and 10, as shown in FIG. 7. The MBMS-RS may be used to demodulate a SFN transmission sent in the data section of a MBMS subframe.

For each of the transmission modes listed in Table 1, a UE-RS may be transmitted to a UE that is receiving data transmission on the downlink from one or more cells. The UE-RS may be different from the CRS and MBMS-RS transmitted by a cell on the downlink. For the beamsteering and MIMO modes, the UE-RS may be generated with a precoding vector or matrix used to precode data for the UE. For the CoMP mode, the UE-RS may be transmitted concurrently with or without precoding by multiple cells to the UE. In any case, some resource elements may be allocated for transmission of the UE-RS. A UE-RS pattern may indicate which resource elements to use to transmit the UE-RS.

FIG. 8A shows a UE-RS pattern 800 for the beamforming mode using one antenna port. A cell may transmit a UE-RS from antenna port 5 on a first subset of subcarriers in symbol periods 3 and 9 and on a second subset of subcarriers in symbol periods 6 and 12. The UE-RS may be transmitted in symbol periods in which the CRS is not transmitted. Each subset may include subcarriers that are spaced apart by four subcarriers. The subcarriers in the second subset may be staggered from the subcarriers in the first subset, as shown in FIG. 8A. UE-RS pattern 800 may be associated with a frequency shift of 0.

Figures 8C, 9:
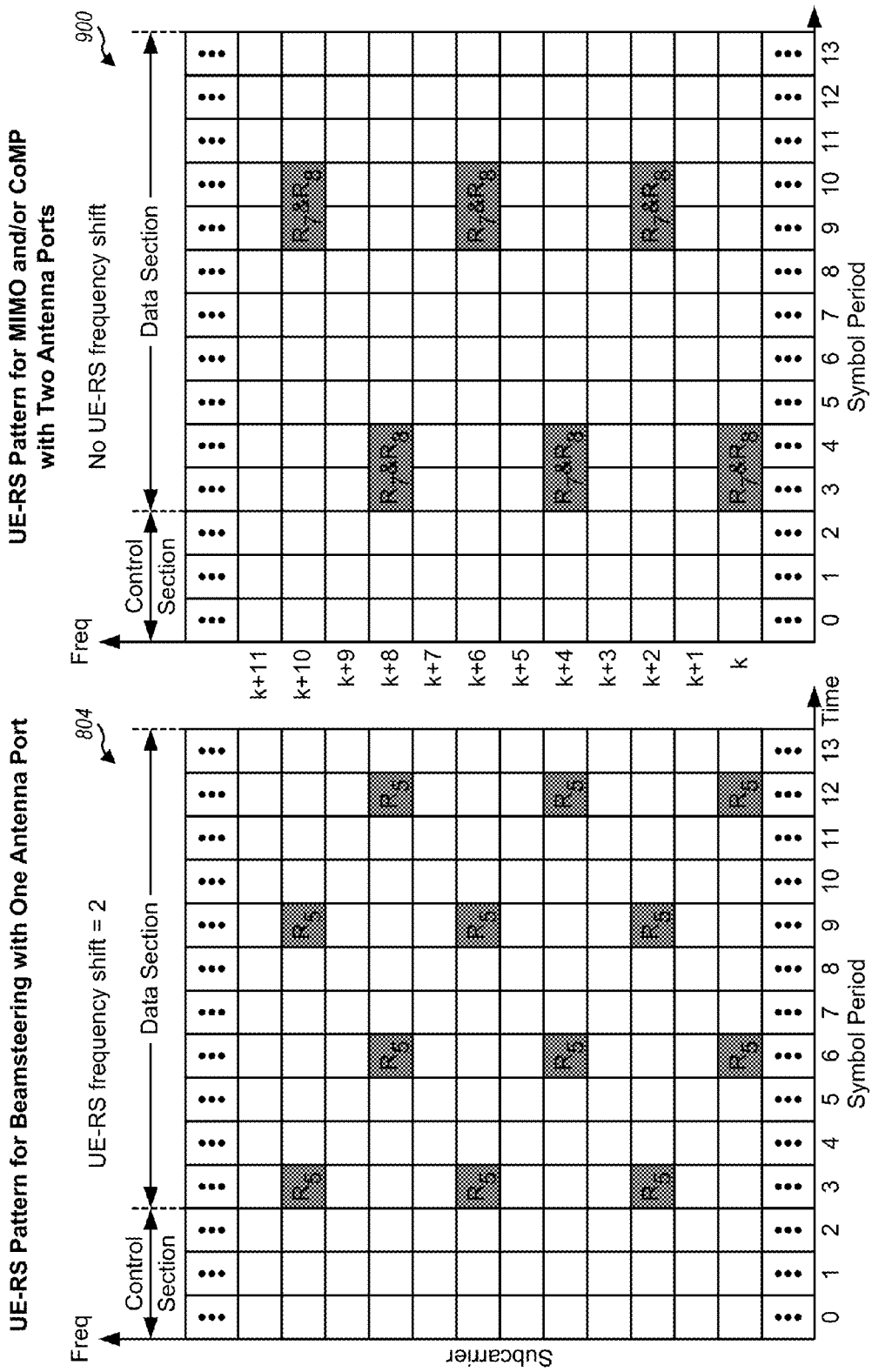

FIG. 8B shows a UE-RS pattern 802 associated with a frequency shift of 1. FIG. 8C shows a UE-RS pattern 804 associated with a frequency shift of 2. As shown in FIGS. 8A, 8B and 8C, the UE-RS patterns for different frequency shifts may be staggered in frequency and may include non-overlapping RS subcarriers.

For the beamforming mode, the subcarriers to use to transmit a UE-RS by a given cell may be determined based on a function of the frequency shift $v_{shift}$ for the cell, which may be determined based on the cell ID as shown in equation (2). The same frequency shift may be used to determine the subcarriers for both the CRS and UE-RS. As shown in FIG. 8A, 8B and 8C, three cells X, Y and Z may have different cell IDs and may be associated with different frequency shifts of 0, 1 and 2, respectively. Cells X, Y and Z may transmit their CRSs and UE-RSs on different subcarriers (as shown in FIGS. 8A, 8B and 8C) in order to avoid collision between the CRSs and UE-RSs from these cells.

In an aspect, UE-RS patterns may be defined to support transmission of UE-RSs from multiple antenna ports for multi-layer beamforming for the MIMO and CoMP modes. The UE-RS patterns should provide consistent channel estimation performance for UEs in different cells. Various exemplary designs of UE-RS patterns for multiple antenna ports are described below.

In a first design, no UE-RS frequency shift is employed, and the same UE-RS pattern may be used by all cells. The UE-RS pattern may include a set of resource elements for the UE-RS for each antenna port. The resource elements for the UE-RS for all antenna ports may be distributed such that good channel estimation can be achieved.

FIG. 9 shows a design of a UE-RS pattern 900 for data transmission from two antenna ports without frequency shift. UE-RS pattern 900 may be used for the MIMO mode and/or the CoMP mode. A cell may transmit two UE-RSs from two antenna ports (e.g., antenna ports 7 and 8) on a first subset of subcarriers in symbol periods 3 and 4 and on a second subset of subcarriers in symbol periods 9 and 10. The cell may transmit the two UE-RSs on the same resource elements from the two antenna ports.

In the design shown in FIG. 9, a UE-RS may be transmitted from each antenna port on evenly spaced RS subcarriers across frequency in each symbol period in which the UE-RS is transmitted. Furthermore, the spacing between RS subcarriers for each antenna port may be maintained across resource blocks. For example, in symbol period 3, the UE-RS may be transmitted from antenna port 7 on subcarrier k+12 in the next resource block above and/or on subcarrier k−4 in the next resource block below. The counting of subcarriers for the UE-RS may thus continue at the top and bottom of each resource block.

The same UE-RS pattern 900 may be used by all cells. For example, three cells X, Y and Z may have different cell IDs and may be associated with different frequency shifts of 0, 1 and 2, respectively. Cells X, Y and Z may transmit their CRSs on different subcarriers (not shown in FIG. 9) but may transmit the UE-RSs on the same subcarriers (as shown in FIG. 9).

In a second design, UE-RS frequency shift is employed, and different UE-RS patterns may be used by different cells. A frequency shift may be determined in various manners, as described below.

Figures 10A, 10B:
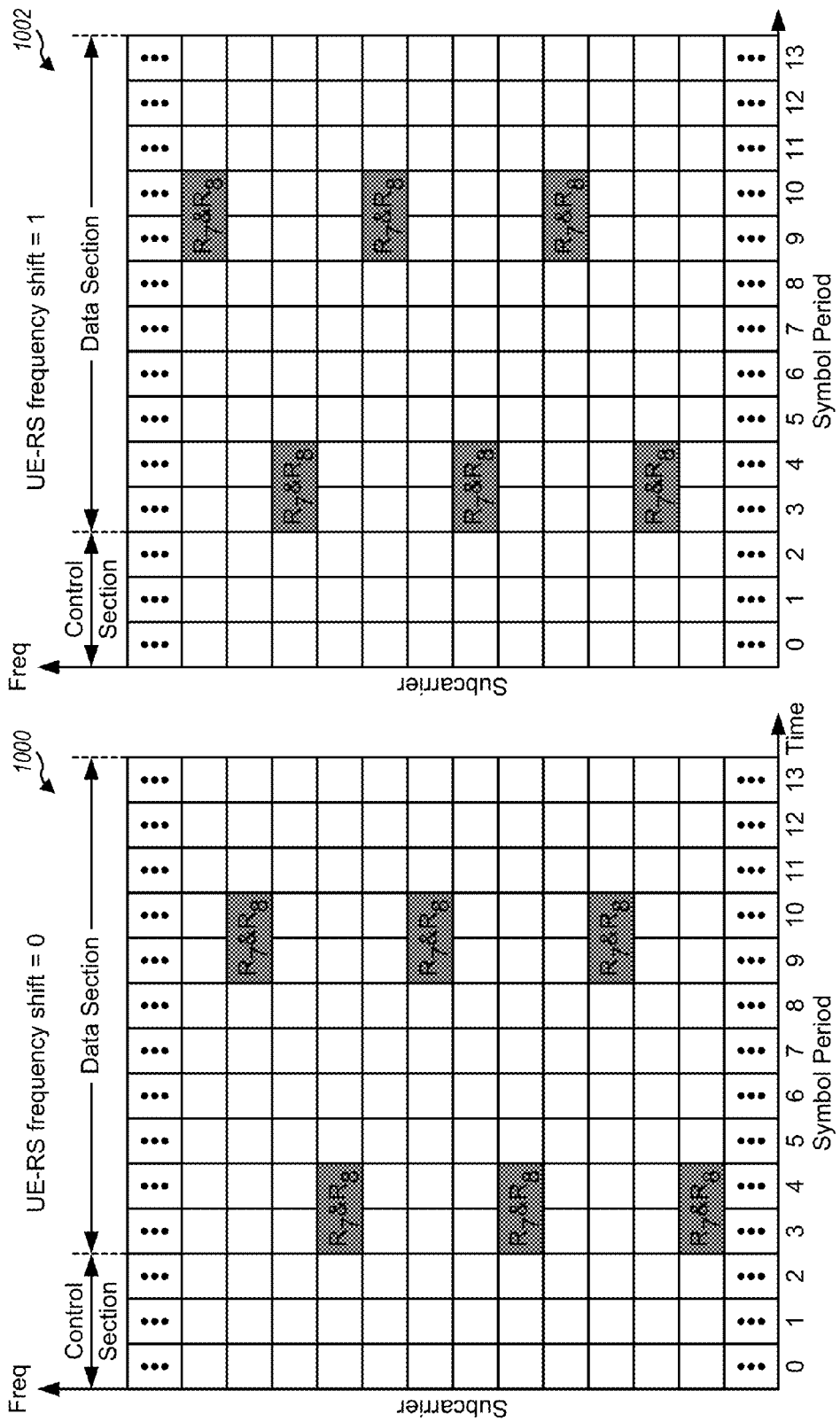
FIGS. 10A, 10B and 10C show three UE-RS patterns for two antenna ports with different frequency shifts.
Figure 10C:
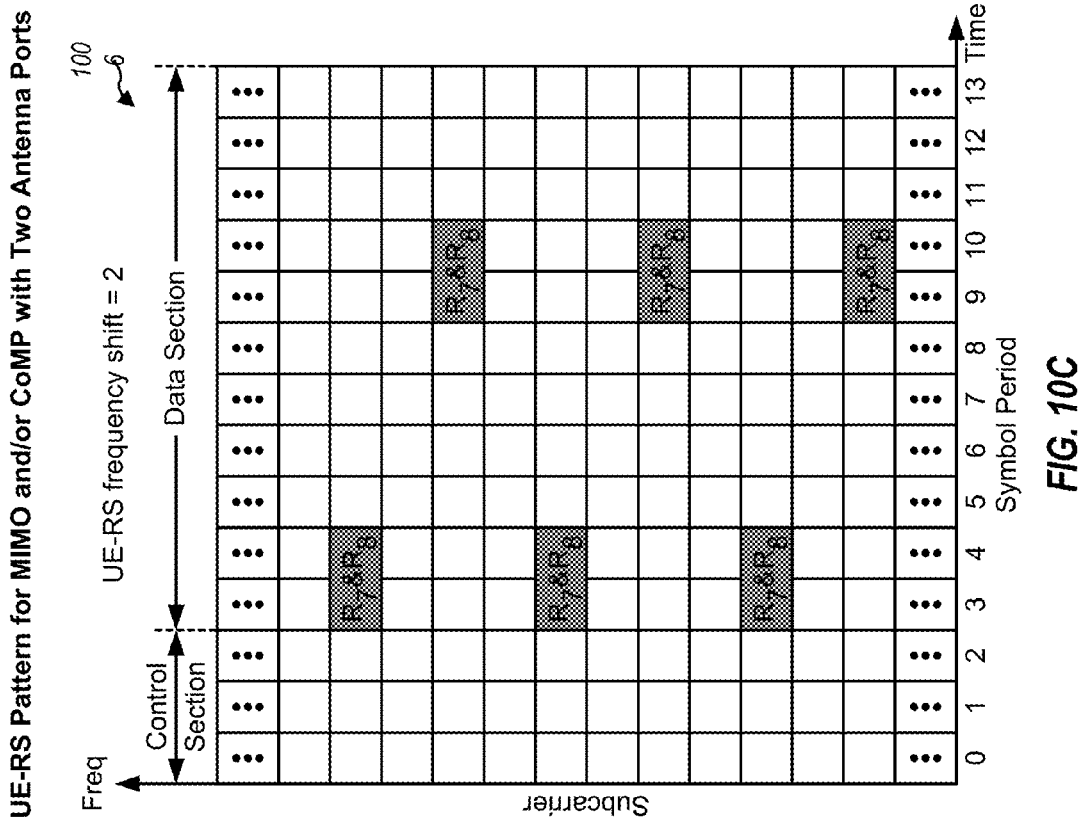

FIGS. 10A, 10B and 10C show a design of UE-RS patterns 1000, 1002 and 1004 for data transmission from two antenna ports with different frequency shifts. UE-RS patterns 1000, 1002 and 1004 may be used for the MIMO mode and/or the CoMP mode. For UE-RS pattern 1000, a cell may transmit two UE-RSs from two antenna ports (e.g., antenna ports 7 and 8) on a first subset of subcarriers in symbol periods 3 and 4 and on a second subset of subcarriers in symbol periods 9 and 10.

UE-RS pattern 1000 may be associated with a frequency shift of 0, UE-RS pattern 1002 may be associated with a frequency shift of 1, and UE-RS pattern 1004 may be associated with a frequency shift of 2. As shown in FIGS. 10A, 10B and 10C, three cells X, Y and Z may be associated with different frequency shifts of 0, 1 and 2, respectively. Cells X, Y and Z may transmit their CRSs and UE-RSs on different subcarriers (as shown in FIGS. 10A, 10B and 10C) in order to avoid collision between the CRSs and UE-RSs from these cells.

The UE-RS frequency shift may be determined in various manners for the MIMO mode. In one design, the UE-RS frequency shift may be determined based on the cell ID, e.g., in similar manner as for the beamsteering mode. In another design, the UE-RS frequency shift may be negotiated between cells. For example, cells that may cause high interference to one another may use different UE-RS frequency shifts.

The UE-RS frequency shift may also be determined in various manners for the CoMP mode. In one design, the UE-RS frequency shift may be determined based on the cell ID of a serving cell in a CoMP set for a UE. In another design, the UE-RS frequency shift may be negotiated between the cells in the CoMP set and semi-statically assigned to the UE. For the CoMP mode, multiple cells in the CoMP set may transmit the UE-RS to the UE. These cells should transmit the UE-RS on the same resource elements. Hence, all cells in the CoMP set should be aware of the UE-RS frequency shift for the UE and may then transmit the UE-RS on the same resource elements to the UE.

For the CoMP mode, multiple cells may transmit data to multiple UEs on the same time-frequency resource. In one design, the same UE-RS frequency shift may be used for all UEs served on the same time-frequency resource with CoMP. In another design, different UE-RS frequency shifts may be used for different UEs served on the same time-frequency resource with CoMP.

In one design that may be applicable for both the MIMO and CoMP modes, the UE-RS frequency shift may be determined based on subframe type. In one design, the UE-RS frequency shift may be determined based on (i) cell ID for regular subframes or (ii) some other parameter (instead of or in addition to cell ID) for MBSFN subframes.

The UE-RS frequency shift may also be determined in other manners for the MIMO and CoMP modes. The UE-RS frequency shift for a UE may be determined in a manner known a priori (e.g., based on the serving cell ID) and may not need to be signaled to the UE. The UE-RS frequency shift may also be configured for a UE and signaled to the UE.

In a third design, UE-RS frequency shift may or may not be employed. Whether or not UE-RS frequency shift is employed for a given cell may be determined in various manners. In one design, each cell may be assigned a group ID, and UE-RS frequency shift may be employed for some group IDs but not for some other group IDs. A group ID may be a cell ID for a cell, an ID for a group of cells, or some other ID. In another design, cells may negotiate to determine whether or not to employ UE-RS frequency shift. In yet another design, a cell may autonomously determine whether or not to employ UE-RS frequency shift. In any case, some cells may employ UE-RS frequency shift for their UEs while other cells may not employ UE-RS frequency shift for their UEs. The cells that do not employ UE-RS frequency shift may use a fixed UE-RS pattern, e.g., UE-RS pattern 900 in FIG. 9. The cells that do employ UE-RS frequency shift may use different UE-RS patterns, e.g., UE-RS pattern 1000, 1002 and 1004 in FIGS. 10A, 10B and 10C. A cell may signal whether or not UE-RS frequency shift is employed by the cell, e.g., via unicast Layer 3 signaling sent to a specific UE, or unicast Layer 2 signaling sent on the PDCCH to a specific UE, or multicast Layer 2 signaling sent to a group of UEs, or broadcast signaling sent to all UEs.

In another design, UE-RS frequency shift may be employed for certain UEs and not for other UEs. For example, UE-RS frequency shift may be employed for UEs operating in the MIMO mode and not employed for UEs operating in the CoMP mode. UE-RS frequency shift may also be employed for UEs observing strong interference on their UE-RSs and not for other UEs.

In yet another design, UE-RS frequency shift may be employed for certain subframes and not employed for other subframes. For example, UE-RS frequency shift may be employed for regular subframes in FIG. 6 and not employed for MBMS subframes in FIG. 7.

In a fourth design, a combination of UE-RS frequency shift and no UE-RS frequency shift may be employed. This may be implemented in various manners. In one design, UE-RS frequency shift may be employed for equally spaced RS subcarriers, and no UE-RS frequency shift may be employed for non-equally spaced RS subcarriers. For example, a UE-RS pattern may include equally spaced RS subcarriers, e.g., as shown in FIG. 10A, 10B or 10C. These equally spaced RS subcarriers may be dependent on the UE-RS frequency shift, which may be determined based on any of the designs described above. The UE-RS pattern may include additional RS subcarriers at fixed frequency locations that are not dependent on the UE-RS frequency shift. These additional RS subcarriers may be located near the edges of a set of resource blocks assigned to a UE, which may improve channel estimation performance near the edges.

The wireless network may support operation on multiple carriers on the downlink, which may be referred to as downlink carriers. A carrier may refer to a range of frequencies available for communication and may be associated with certain characteristics. For example, a carrier may carry synchronization signals, or may be associated with system information describing operation on the carrier, etc.

In one design, control information may be sent on a subset of the multiple downlink carriers to support communication on all downlink carriers. For each downlink carrier on which control information can be sent, regular subframes (e.g., as shown in FIG. 6) may be used to send control information and data to UEs. A UE-RS may be transmitted in a data section of a regular subframe, e.g., as shown in FIG. 9, 10A, 10B or 10C. For each downlink carrier on which control information is not sent, full subframes that include only the data section (or mostly the data section) may be used to transmit only data (or mostly data) to UEs. A UE-RS may be transmitted in a data section of a full subframe. For example, control information may be sent on downlink carrier X to support data transmission on both downlink carriers X and Y. In this case, data and control information may be sent in a regular subframe on downlink carrier X, and only data may be sent in a full subframe on downlink carrier Y.

Figures 11, 12:
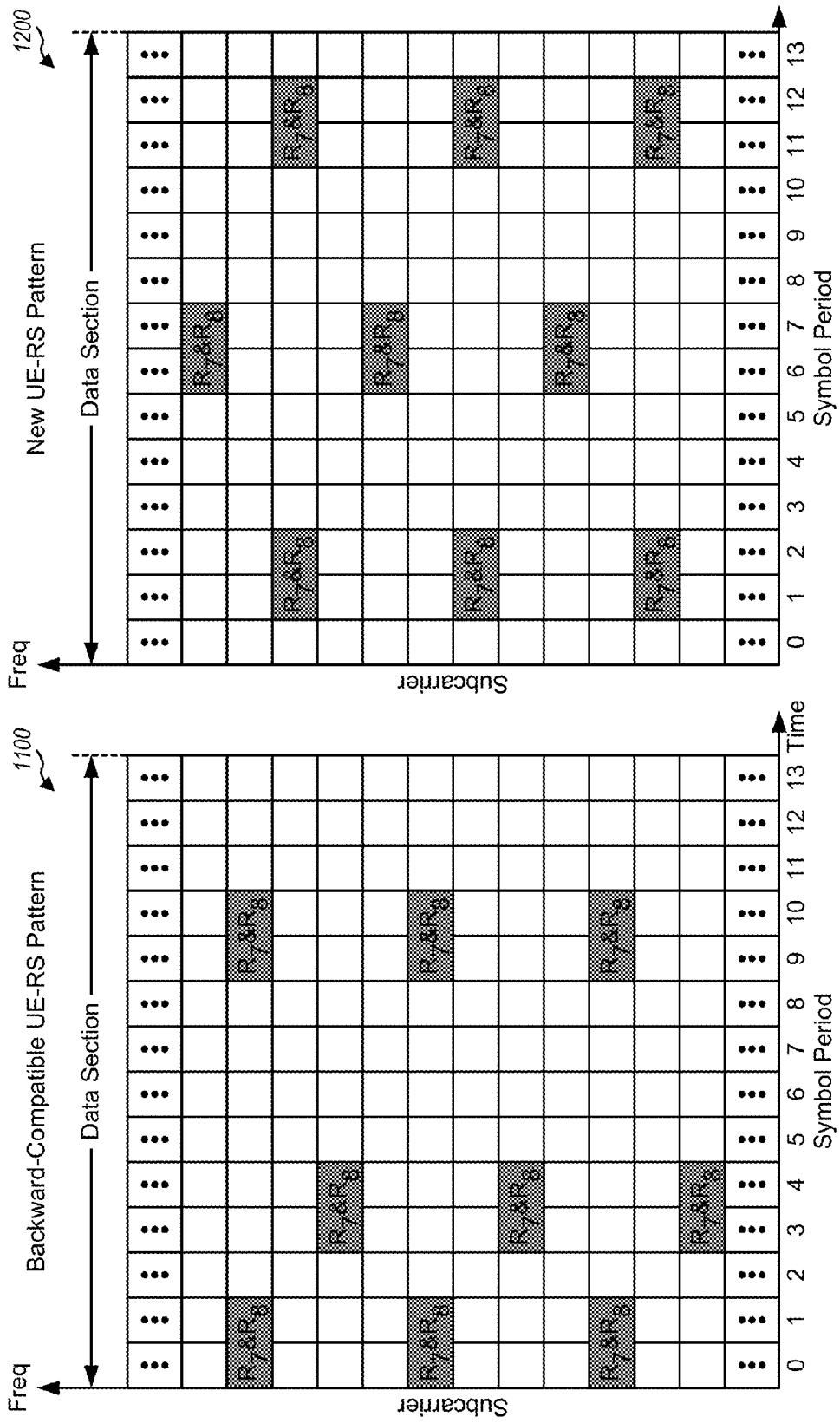
FIGS. 11 and 12 show two UE-RS patterns for two antenna ports for a full subframe with only a data section.

FIG. 11 shows a design of a UE-RS pattern 1100 for data transmission from two antenna ports in a full subframe having only a data section (i.e., without a control section). UE-RS pattern 1100 may be used for the MIMO mode and/or the CoMP mode. UE-RS pattern 1100 includes all RS resource elements for two UE-RSs for two antenna ports 7 and 8 shown in UE-RS pattern 900 in FIG. 9. UE-RS pattern 1100 further includes additional RS resource elements in symbol periods 0 and 1 since no control section is present. A UE-RS may be transmitted across more of the full subframe, which may improve channel estimation performance. UE-RS pattern 1100 in FIG. 11 may maintain backward compatibility with UE-RS pattern 900 in FIG. 9.

FIG. 12 shows a design of a UE-RS pattern 1200 for data transmission from two antenna ports in a full subframe having only a data section. UE-RS pattern 1200 may also be used for the MIMO mode and/or the CoMP mode. UE-RS pattern 1200 includes RS resource elements that are distributed more evenly across the full subframe than the RS resource elements in UE-RS pattern 1100 in FIG. 11. In one design, a UE-RS pattern may be defined for a full subframe without regards to the RS resource elements in a UE-RS pattern used for a regular subframe. This may provide flexibility in placing RS resource elements at locations that can provide good channel estimation performance.

In one design, UE-RS pattern 1100 and/or 1200 may be used without UE-RS frequency shift, e.g., in similar manner as UE-RS pattern 900 in FIG. 9. In another design, UE-RS pattern 1100 and/or 1200 may be used with UE-RS frequency shift. In this design, different UE-RS patterns may be defined for different frequency shifts, e.g., in similar manner as UE-RS patterns 1000, 1002 and 1004 in FIGS. 10A, 10B and 10C. In yet another design, UE-RS frequency shift may be (i) employed for some RS resource elements (e.g., the backward compatible RS resource elements in symbol periods 3 through 12 in UE-RS pattern 1100) and (ii) disabled for other RS resource elements (e.g., the additional RS resource elements in symbol periods 0 and 1 in UE-RS pattern 1100).

FIGS. 9 through 12 show some exemplary UE-RS patterns for two antenna ports. UE-RS patterns for more than two antenna ports may also be defined. In general, the resource elements used to transmit a UE-RS from an antenna port may be spaced apart by any number of subcarriers in frequency and any number of symbol periods in time. For example, the resource elements for a UE-RS may be spaced apart by 2, 3, 4, 5, 6 or some other number of subcarriers. A UE-RS may also be transmitted every 3, 4, 5, 6 or some other number of symbol periods. In general, using more resource elements for a UE-RS may provide better channel estimation at the expense of higher overhead for the UE-RS, and vice versa.

The techniques described herein may be used for the UE-RS, as described above. The techniques may also be used for other types of reference signal. For example, the techniques may be used for a channel state information reference signal (CSI-RS), which may be transmitted by a cell and used by UEs to estimate received signal quality and/or quantity for the cell.

Figures 13, 14:
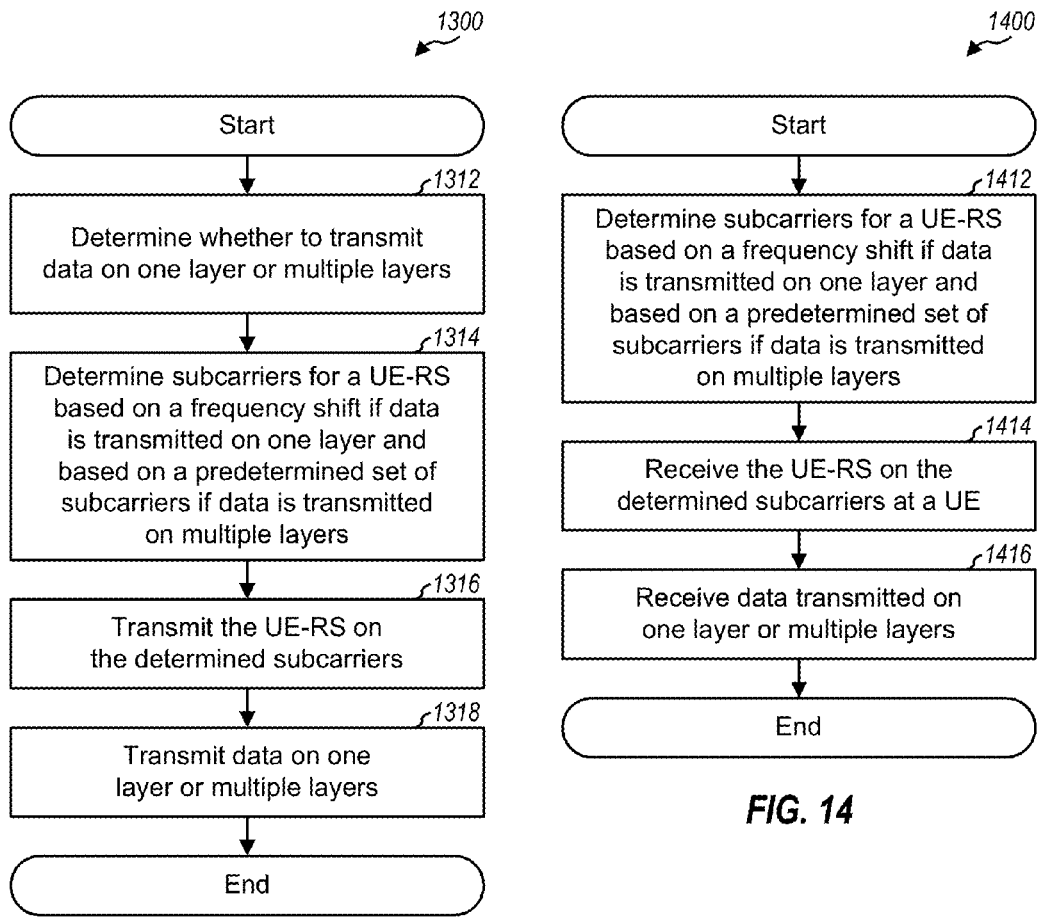
FIG. 13 shows a process for transmitting UE-RS based on the number of antenna ports used for data transmission.
FIG. 14 shows a process for receiving UE-RS based on the number of antenna ports.

FIG. 13 shows a design of a process 1300 for transmitting UE-RS based on the number of layers (or antenna ports) used for data transmission. Process 1300 may be performed by a cell (as described below) or by some other entity. The cell may determine whether to transmit data on one layer or multiple layers (or from one antenna port or multiple antenna ports) (block 1312). The cell may determine subcarriers for a UE-RS based on a frequency shift if data is transmitted on one layer and based on a predetermined set of subcarriers (with no frequency shift) if data is transmitted on multiple layers (block 1314). The cell may transmit the UE-RS on the determined subcarriers (block 1316). The cell may transmit data on one layer or multiple layers, as determined in block 1312 (block 1318).

In one design of block 1312, the cell may determine to transmit data on one layer if the data is sent to one UE with beamsteering. The cell may determine to transmit data on multiple layers if the data is sent to one or more UEs with MIMO or CoMP. The cell may also determine whether to transmit data on one or multiple layers in other manners.

In one design of block 1314, the cell may select a set of subcarriers for the UE-RS from among a plurality of possible sets of subcarriers based on the frequency shift if data is transmitted on one layer. The plurality of sets of subcarriers may be offset in frequency and non-overlapping, e.g., as shown in FIGS. 8A to 8C. The selected set may include subcarriers k+1, k+3, k+5, k+7, k+9, and k+11 for the design shown in FIG. 8A. The cell may select a fixed set of subcarriers for the UE-RS if data is transmitted on multiple layers, e.g., as shown in FIG. 9. The fixed set may include subcarriers k, k+2, k+4, k+6, k+8, and k+10 in FIG. 9. In either case, the determined subcarriers may be evenly spaced across at least one resource block in which the UE-RS is transmitted.

In one design, a plurality of cells (e.g., with different cell IDs) may transmit UE-RSs on different subcarriers determined based on different frequency shifts for data transmitted on one layer. The plurality of cells may transmit UE-RSs on fixed designated subcarriers for data transmitted on multiple layers.

In one design, for data transmission on one layer, the cell may transmit the UE-RS and data on one layer to a UE. In one design, for data transmission on multiple layers, the cell may transmit data on multiple layers to one or more UEs. The cell may transmit the UE-RS on one layer to one UE among the one or more UEs. The cell may transmit at least one additional UE-RS on at least one other layer to at least one UE among the one or more UEs. In both cases, the cell may precode the UE-RS and data based on a precoding vector prior to transmission, e.g., as shown in equation (2).

FIG. 14 shows a design of a process 1400 for receiving UE-RS based on the number of layers (or antenna ports) used for data transmission. Process 1400 may be performed by a UE (as described below) or by some other entity. The UE may determine subcarriers for a UE-RS based on a frequency shift if data is transmitted on one layer (or from one antenna port) and based on a predetermined set of subcarriers (with no frequency shift) if data is transmitted on multiple layers (or from multiple antenna ports) (block 1412). The UE may receive the UE-RS on the determined subcarriers (block 1414). The UE may receive data transmitted on one layer or multiple layers (block 1416). In one design, the UE may receive data transmitted on one layer if the data is sent to the UE with beamsteering. In one design, the UE may receive data transmitted on multiple layers if the data is sent to one or more UEs with MIMO or CoMP, with the UE being one of the UE(s).

In one design of block 1412, the UE may select a set of subcarriers for the UE-RS from among a plurality of possible sets of subcarriers based on the frequency shift if data is transmitted on one layer. The plurality of sets of subcarriers may be offset in frequency and non-overlapping. The UE may select a fixed set of subcarriers for the UE-RS if data is transmitted on multiple layers.

Figure 15:
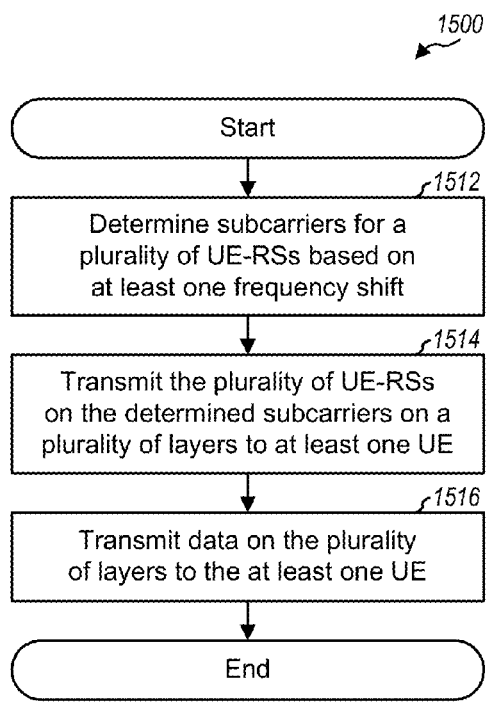
FIG. 15 shows a process for transmitting UE-RS with frequency shift.

FIG. 15 shows a design of a process 1500 for transmitting UE-RS with frequency shift. Process 1500 may be performed by a cell (as described below) or by some other entity. The cell may determine subcarriers for a plurality of UE-RSs based on at least one frequency shift (block 1512). The cell may transmit the plurality of UE-RSs on the determined subcarriers on a plurality of layers (or from a plurality of antenna ports) to at least one UE, e.g., one UE-RS on each layer (block 1514). The cell may also transmit data on the plurality of layers to the at least one UE (block 1516).

In one design, the cell may transmit two UE-RSs on two layers, one UE-RS on each layer. The cell may also transmit more UE-RSs on more layers. In one design, the cell may precode the plurality of UE-RSs and data based on at least one precoding vector for the at least one UE. The cell may transmit the plurality of UE-RSs and data, after precoding, on the plurality of layers.

In one design, the subcarriers for the plurality of UE-RSs may be determined based on a single frequency shift. In one design of block 1512, the cell may determine the frequency shift based on its cell ID. The cell may determine a set of subcarriers for the plurality of UE-RSs from among a plurality of possible sets of subcarriers based on the frequency shift. The plurality of sets of subcarriers may be offset in frequency and non-overlapping. In another design, the at least one UE may be configured with the frequency shift, which may be selected from a plurality of possible frequency shifts. Signaling may be sent to convey the frequency shift if it is not known by the at least one UE.

In one design, the at least one UE may comprise a single UE, and the plurality of UE-RSs may be transmitted by a single cell to the single UE for SU-MIMO. In another design, the at least one UE may comprise a plurality of UEs, and the plurality of UE-RSs may be transmitted by a single cell to the plurality of UEs for MU-MIMO. In yet another design, the at least one UE may comprise a single UE, and the plurality of UE-RSs may be transmitted by a plurality of cells on the same subcarriers to the single UE for CoMP. In yet another design, the at least one UE may comprise a plurality of UEs, and the plurality of UE-RSs may be transmitted by a plurality of cells to the plurality of UEs for CoMP.

In one design, the at least one UE may comprise a plurality of UEs, and each UE may receive at least one of the plurality of UE-RSs. In one design, a single frequency shift may be used for all UEs. In another design, a plurality of frequency shifts may be used for the plurality of UEs, with each UE having a different frequency shift.

In one design, the cell may ascertain whether or not to use the at least one frequency shift to determine the subcarriers for the plurality of UE-RSs. The cell may use fixed designated subcarriers for the plurality of UE-RSs if the at least one frequency shift is not used to determine the subcarriers for the plurality of UE-RSs. For example, the cell may ascertain whether or not to use the at least one frequency shift based on (i) an identity (e.g., a group ID or a cell ID) applicable to the cell, (ii) a type of a subframe in which the plurality of UE-RSs are transmitted, and/or (iii) some other factors.

In one design, the plurality of UE-RSs may be transmitted on some RS subcarriers determined based on the frequency shift and on additional RS subcarriers not determined based on the frequency shift. The cell may determine at least one additional subcarrier for the plurality of UE-RSs not based on the frequency shift. The cell may further transmit the plurality of UE-RSs on the at least one additional subcarrier on the plurality of layers to the at least one UE. In one design, the determined subcarriers may be evenly spaced across at least one resource block, and the at least one additional subcarrier may not be evenly spaced across the at least one resource block. In one design, the plurality of UE-RSs may be transmitted on at least one resource block. The at least one additional subcarrier may be located near at least one edge of the at least one resource block.

In one design of block 1514, the cell may transmit the plurality of UE-RSs in only a data section of a subframe comprising the data section and a control section. In another design, the cell may transmit the plurality of UE-RSs in a data section of a subframe comprising only the data section and no control section.

Figure 16:
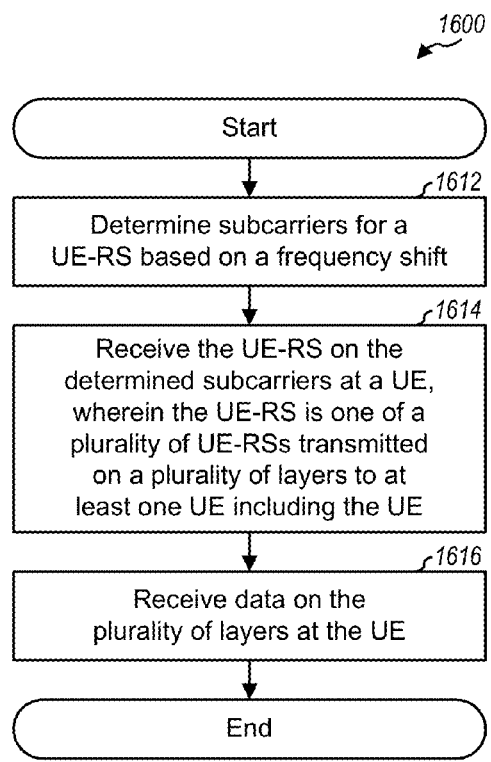
FIG. 16 shows a process for receiving UE-RS with frequency shift.

FIG. 16 shows a design of a process 1600 for receiving UE-RS with frequency shift. Process 1600 may be performed by a UE (as described below) or by some other entity. The UE may determine subcarriers for a UE-RS based on a frequency shift (block 1612). The UE may receive the UE-RS on the determined subcarriers (block 1614). The UE-RS may be one of a plurality of UE-RSs transmitted on a plurality of layers (or from a plurality of antenna ports) to at least one UE including the UE. The UE may receive data on the plurality of layers (block 1616).

In one design of block 1612, the UE may determine the frequency shift based on a cell ID of a serving cell. The UE may determine a set of subcarriers for the UE-RS from among a plurality of possible sets of subcarriers based on the frequency shift. The plurality of sets of subcarriers may be offset in frequency and non-overlapping. In another design, the frequency shift may be configured for the UE and may be selected from a plurality of possible frequency shifts.

In one design, the at least one UE may comprise only the UE, and the plurality of UE-RSs may be transmitted by a single cell to the UE for SU-MIMO. In another design, the at least one UE may comprise a plurality of UEs including the UE, and the plurality of UE-RSs may be transmitted by a single cell to the plurality of UEs for MU-MIMO. In yet another design, the at least one UE may comprise only the UE, and the plurality of UE-RSs may be transmitted by a plurality of cells on the same subcarriers to the UE for CoMP. In yet another design, the at least one UE may comprise a plurality of UEs including the UE, and the plurality of UE-RSs may be transmitted by a plurality of cells to the plurality of UEs for CoMP.

In one design, the UE may ascertain whether or not to use the at least one frequency shift to determine the subcarriers for the plurality of UE-RSs. The UE may use fixed designated subcarriers for the plurality of UE-RSs if the at least one frequency shift is not used to determine the subcarriers for the plurality of UE-RSs.

In one design, the plurality of UE-RSs may be transmitted on some RS subcarriers determined based on the frequency shift and on additional RS subcarriers not determined based on the frequency shift. The UE may determine at least one additional subcarrier for the UE-RS not based on the frequency shift and may receive the UE-RS further on the at least one additional subcarrier.

In one design of block 1614, the UE may receive the UE-RS in only a data section of a subframe comprising the data section and a control section. In another design, the UE may receive the UE-RS in a data section of a subframe comprising only the data section and no control section.

Figure 17:
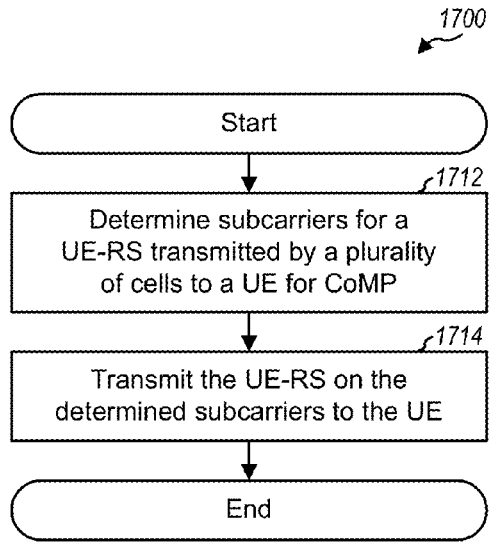
FIG. 17 shows a process for transmitting UE-RS for CoMP.

FIG. 17 shows a design of a process 1700 for transmitting UE-RS for CoMP. Process 1700 may be performed by a cell (as described below) or by some other entity. The cell may determine subcarriers for a UE-RS transmitted by a plurality of cells to a UE for CoMP (block 1712). The plurality of cells may belong in a CoMP set for the UE and may include the cell. In one design, the subcarriers for the UE-RS may be fixed designated subcarriers. In another design, the subcarriers for the UE-RS may be determined based on a frequency shift, which may be determined based on a cell ID of a serving cell for the UE or may be configured for the UE. The cell may transmit the UE-RS on the determined subcarriers to the UE (block 1714). The cell may transmit the UE-RS on a single layer to the UE.

In one design, the cell may determine second subcarriers for a second UE-RS transmitted by the plurality of cells to a second UE for CoMP. The second subcarriers may be the same as the subcarriers determined in block 1712 or different subcarriers. The cell may transmit the second UE-RS on the second subcarriers to the second UE. The UE and the second UE may both be scheduled for data transmission on at least one resource block. The UE-RS and the second UE-RS may be transmitted on the at least one resource block.

Figure 18:
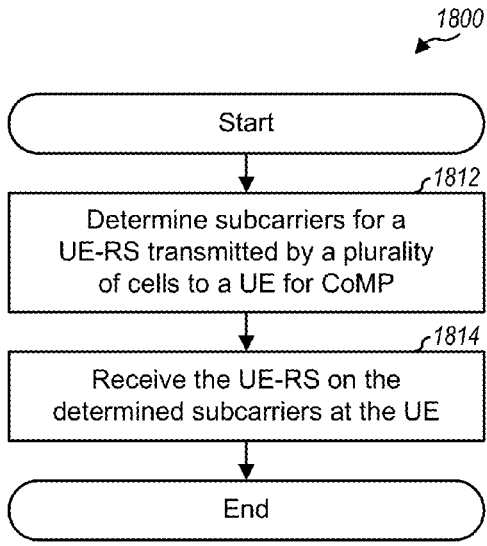
FIG. 18 shows a process for receiving UE-RS for CoMP.

FIG. 18 shows a design of a process 1800 for receiving UE-RS for CoMP. Process 1800 may be performed by a UE (as described below) or by some other entity. The UE may determine subcarriers for a UE-RS transmitted by a plurality of cells to the UE for CoMP (block 1812). In one design, the subcarriers for the UE-RS may be fixed designated subcarriers. In another design, the subcarriers for the UE-RS may be determined based on a frequency shift, which may be determined based on a cell ID of a serving cell for the UE or may be configured for the UE. The UE may receive the UE-RS on the determined subcarriers (block 1814).

Figure 19:
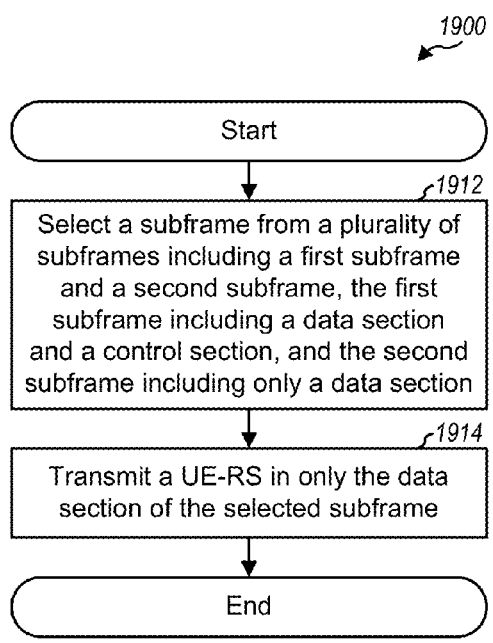
FIG. 19 shows a process for transmitting UE-RS in a selected subframe.

FIG. 19 shows a design of a process 1900 for transmitting UE-RS. Process 1900 may be performed by a cell (as described below) or by some other entity. The cell may select a subframe from a plurality of subframes including a first subframe and a second subframe (block 1912). The first subframe may include a data section and a control section, and the second subframe may include only the data section. The cell may transmit a UE-RS in only the data section of the selected subframe (block 1914).

In one design of block 1912, the cell may select the first subframe for a first carrier in which control information is sent. The cell may select the second subframe for a second carrier in which control information is not sent. The cell may also select the first or second subframe based on other criteria.

In one design, the first subframe may be associated with a first UE-RS pattern indicative of a first set of resource elements for the UE-RS, e.g., as shown in FIG. 9. The second subframe may be associated with a second UE-RS pattern indicative of a second set of resource elements for the UE-RS. In one design, second set of resource elements may include the first set of resource elements and at least one additional resource element, e.g., as shown in FIGS. 9 and 11. In another design, the first and second sets of resource elements may be non-overlapping and/or may include different resource elements, e.g., as shown in FIGS. 9 and 12.

Figure 20:
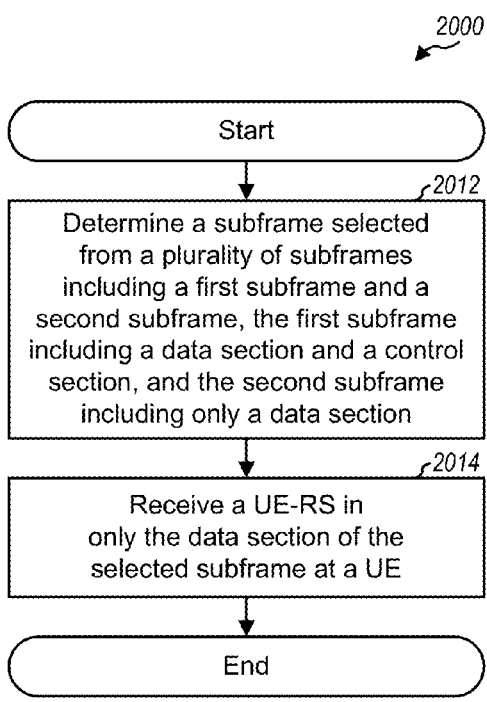
FIG. 20 shows a process for receiving UE-RS in a selected subframe.

FIG. 20 shows a design of a process 2000 for receiving UE-RS. Process 2000 may be performed by a UE (as described below) or by some other entity. The UE may determine a subframe selected from a plurality of subframes including a first subframe and a second subframe (block 2012). The first subframe may include a data section and a control section, and the second subframe may include only the data section. The UE may receive a UE-RS in only the data section of the selected subframe (block 2014).

In one design, the first subframe may be selected for a first carrier in which control information is sent. The second subframe may be selected for a second carrier in which control information is not sent. The first or second subframe may also be selected based on other criteria.

In one design, the first subframe may be associated with a first UE-RS pattern indicative of a first set of resource elements for the UE-RS. The second subframe may be associated with a second UE-RS pattern indicative of a second set of resource elements for the UE-RS. In one design, the second set of resource elements may include the first set of resource elements and at least one additional resource element. In another design, the first and second sets of resource elements may be non-overlapping and/or may include different resource elements.

Figure 21:
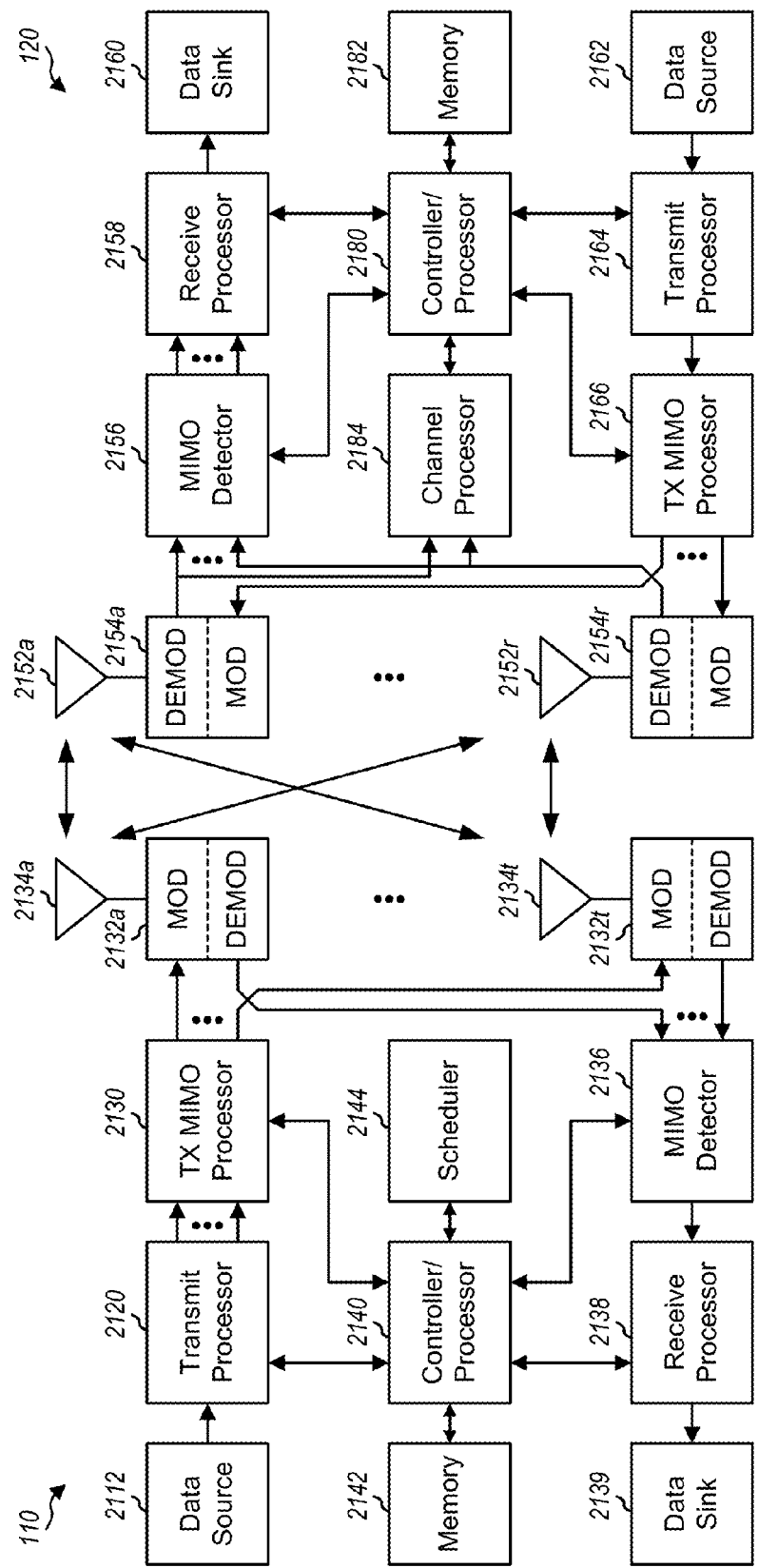
FIG. 21 shows a block diagram of a base station and a UE.

FIG. 21 shows a block diagram of a design of base station/eNB 110 and UE 120, which may be one of the base stations/eNBs and one of the UEs in FIG. 1. Base station 110 may serve one or more cells and may be equipped with multiple (T) antennas 2134a through 2134t. UE 120 may be equipped with R antennas 2152a through 2152r, where in general R≥1.

At base station 110, a transmit processor 2120 may receive data from a data source 2112 for one or more UEs, process (e.g., encode and modulate) the data for each UE based on one or more modulation and coding schemes selected for that UE, and provide data symbols for all UEs. Transmit processor 2120 may also process control information (e.g., for scheduling grants, frequency offset, UE-RS pattern, etc.) and provide control symbols. Processor 2120 may also generate reference symbols for reference signals (e.g., CRS, UE-RSs etc.). In one design, processor 2120 may implement data processor 310, layer mapper 312, and UE-RS generator 322 in FIG. 1. A transmit (TX) MIMO processor 2130 may perform spatial processing (e.g., precoding) on the data symbols, the control symbols, and/or the reference symbols, if applicable, and may provide T output symbol streams to T modulators (MODs) 2132a through 2132t. In one design, processor 2130 may implement precoders 314 and 324 and demultiplexer 330 in FIG. 3. Each modulator 2132 may process a respective output symbol stream (e.g., for OFDM, etc.) to obtain an output sample stream. In one design, each modulator 2132 may implement one resource element mapper 332 and one OFDM modulator 334 in FIG. 3. Each modulator 2132 may further process (e.g., convert to analog, amplify, filter, and upconvert) the output sample stream to obtain a downlink signal. T downlink signals from modulators 2132a through 2132t may be transmitted via T antennas 2134a through 2134t, respectively.

At UE 120, antennas 2152a through 2152r may receive the downlink signals from base station 110 and/or other base stations and may provide received signals to demodulators (DEMODs) 2154a through 2154r, respectively. Each demodulator 2154 may condition (e.g., filter, amplify, downconvert, and digitize) its received signal to obtain input samples. Each demodulator 2154 may further process the input samples (e.g., for OFDM, etc.) to obtain received symbols. In one design, each demodulator 2154 may implement one OFDM demodulator 414 and one resource element demapper 416 in FIG. 4. A channel processor 2184 may implement channel estimator 422 in FIG. 4 and may derive a channel estimate based on one or more UE-RSs transmitted to UE 120 and/or CRS transmitted to all UE. A MIMO detector 2156 may obtain received symbols from all R demodulators 2154a through 2154r, perform MIMO detection on the received symbols based on the channel estimate, and provide detected symbols. MIMO detector 2156 may implement MIMO detector 424 in FIG. 4. A receive processor 2158 may process (e.g., demodulate and decode) the detected symbols, provide decoded data for UE 120 to a data sink 2160, and provide decoded control information to a controller/processor 2180. Processor 2158 may implement data processor 426 in FIG. 4.

On the uplink, at UE 120, a transmit processor 2164 may receive and process data from a data source 2162 and control information from controller/processor 2180. Processor 2164 may also generate reference symbols for one or more reference signals. The symbols from transmit processor 2164 may be precoded by a TX MIMO processor 2166 if applicable, further processed by modulators 2154a through 2154r (e.g., for SC-FDM, OFDM, etc.), and transmitted to base station 110. At base station 110, the uplink signals from UE 120 and other UEs may be received by antennas 2134, processed by demodulators 2132, detected by a MIMO detector 2136 if applicable, and further processed by a receive processor 2138 to obtain decoded data and control information sent by UE 120. Processor 2138 may provide the decoded data to a data sink 2139 and the decoded control information to controller/processor 2140.

Controllers/processors 2140 and 2180 may direct the operation at base station 110 and UE 120, respectively. Processor 2140 and/or other processors and modules at base station 110 may perform or direct process 1300 in FIG. 13, process 1500 in FIG. 15, process 1700 in FIG. 17, process 1900 in FIG. 19, and/or other processes for the techniques described herein. Processor 2180 and/or other processors and modules at UE 120 may perform or direct process 1400 in FIG. 14, process 1600 in FIG. 16, process 1800 in FIG. 18, process 2000 in FIG. 20, and/or other processes for the techniques described herein. Memories 2142 and 2182 may store data and program codes for base station 110 and UE 120, respectively. A scheduler 2144 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining whether to transmit data on one layer or multiple layers;
    selecting a set of subcarriers from among a plurality of possible sets of subcarriers for a user equipment-specific reference signal (UE-RS) based on a frequency shift if data is transmitted on one layer, the plurality of sets of subcarriers being offset in frequency and non-overlapping;
    selecting a predetermined set of subcarriers for the UE-RS if data is transmitted on multiple layers; and
    transmitting the UE-RS on the selected subcarriers.

2. The method of claim 1, wherein the determining whether to transmit data on one layer or multiple layers comprises
    determining to transmit data on one layer if the data is sent to one UE with beamsteering, and
    determining to transmit data on multiple layers if the data is sent to one or more UEs with multiple-input multiple-output (MIMO) or coordinated multi-point (CoMP).

3. The method of claim 1, wherein the selected subcarriers are evenly spaced across at least one resource block in which the UE-RS is transmitted.

4. The method of claim 1, wherein a plurality of cells transmit UE-RS s on different subcarriers determined based on different frequency shifts for data transmitted on one layer, and wherein the plurality of cells transmit UE-RSs on the predetermined set of subcarriers for data transmitted on multiple layers.

5. The method of claim 1, further comprising:
    precoding the UE-RS and data based on a precoding vector prior to transmission.

6. The method of claim 1, further comprising:
    transmitting data on one layer to a UE; and
    transmitting the UE-RS on the one layer to the UE.

7. The method of claim 1, further comprising:
    transmitting data on multiple layers to one or more UEs;
    transmitting the UE-RS on one of the multiple layers to one of the one or more UEs; and
    transmitting at least one additional UE-RS on at least one other layer to at least one UE among the one or more UEs.

8. An apparatus for wireless communication, comprising:
    means for determining whether to transmit data on one layer or multiple layers;
    means for selecting a set of subcarriers from among a plurality of possible sets of subcarriers for a user equipment-specific reference signal (UE-RS) based on a frequency shift if data is transmitted on one layer, the plurality of sets of subcarriers being offset in frequency and non-overlapping;
    means for selecting a predetermined set of subcarriers for the UE-RS if data is transmitted on multiple layers; and
    means for transmitting the UE-RS on the selected subcarriers.

9. The apparatus of claim 8, wherein the means for determining whether to transmit data on one layer or multiple layers comprises
    means for determining to transmit data on one layer if the data is sent to one UE with beamsteering, and
    means for determining to transmit data on multiple layers if the data is sent to one or more UEs with multiple-input multiple-output (MIMO) or coordinated multi-point (CoMP).

10. An apparatus for wireless communication, comprising:
    at least one processor configured to:
        determine whether to transmit data on one layer or multiple layers;
        select a set of subcarriers from among a plurality of possible sets of subcarriers for a user equipment-specific reference signal (UE-RS) based on a frequency shift if data is transmitted on one layer, the plurality of sets of subcarriers being offset in frequency and non-overlapping;
        select a predetermined set of subcarriers for the UE-RS if data is transmitted on multiple layers; and
        send the UE-RS on the selected subcarriers.

11. The apparatus of claim 10, wherein the at least one processor is configured to determine to transmit data on one layer if the data is sent to one UE with beamsteering, and to determine to transmit data on multiple layers if the data is sent to one or more UEs with multiple-input multiple-output (MIMO) or coordinated multi-point (CoMP).

12. A computer program product, comprising:
a non-transitory computer-readable medium comprising:
code for causing at least one computer to determine whether to transmit data on one layer or multiple layers,
code for causing the at least one computer to select a set of subcarriers from among a plurality of possible sets of subcarriers for a user equipment-specific reference signal (UE-RS) based on a frequency shift if data is transmitted on one layer, the plurality of sets of subcarriers being offset in frequency and non-overlapping;
code for causing the at least one computer to select a predetermined set of subcarriers for the UE-RS if data is transmitted on multiple layers; and
code for causing the at least one computer to send the UE-RS on the selected subcarriers.

13. A method for wireless communication, comprising:
selecting a set of subcarriers for a user equipment-specific reference signal (UE-RS) from among a plurality of possible sets of subcarriers based on a frequency shift if data is transmitted on one layer, the plurality of sets of subcarriers being offset in frequency and non-overlapping;
selecting a predetermined set of subcarriers for the UE-RS if data is transmitted on multiple layers; and
receiving the UE-RS on the selected subcarriers at a UE.

14. The method of claim 13, further comprising:
receiving data transmitted on one layer if the data is sent to the UE with beamsteering; and
receiving data transmitted on multiple layers if the data is sent to one or more UEs with multiple-input multiple-output (MIMO) or coordinated multi-point (CoMP), the one or more UEs including the UE.

15. An apparatus for wireless communication, comprising:
means for selecting a set of subcarriers for a user equipment-specific reference signal (UE-RS) from among a plurality of possible sets of subcarriers based on a frequency shift if data is transmitted on one layer, the plurality of sets of subcarriers being offset in frequency and non-overlapping;
means for selecting a predetermined set of subcarriers for the UE-RS if data is transmitted on multiple layers; and
means for receiving the UE-RS on the selected subcarriers at a UE.

16. The apparatus of claim 15, further comprising:
means for receiving data transmitted on one layer if the data is sent to the UE with beamsteering; and
means for receiving data transmitted on multiple layers if the data is sent to one or more UEs with multiple-input multiple-output (MIMO) or coordinated multi-point (CoMP), the one or more UEs including the UE.

17. A method of wireless communication, comprising:
determining subcarriers for a user equipment specific reference signal (UE-RS) based at least in part on a number of layers to use for data transmission, including:
determining a first set of subcarriers for the UE-RS from among a plurality of possible sets of subcarriers based on a frequency shift associated with a cell identifier when the number of layers to use for data transmission is one, the plurality of sets of subcarriers being offset in frequency and non-overlapping; and
determining second subcarriers independent of the cell identifier when the number of layers to use for data transmission is more than one; and
mapping reference symbols for the UE-RS to the first or second subcarriers for transmission.

18. The method of claim 17, wherein the data transmission is associated with a spatial-multiplexing transmission mode of a UE receiving the data transmission.

19. The method of claim 17, wherein the determining the second subcarriers comprises determining an equal subcarrier spacing.

20. The method of claim 19, wherein a count associated with the equal subcarrier spacing is reset at a resource block boundaries of the data transmission.

21. The method of claim 17, wherein the determining the second subcarriers comprises using a predetermined pattern.

22. The method of claim 21, wherein the predetermined pattern is common to a group of cells in a wireless communication system.

23. The method of claim 17, wherein the determining the subcarriers is based at least in part an identifier associated with a UE receiving the data transmission.

24. A method for wireless communication, comprising:
determining at least one frequency shift;
determining a set of subcarriers for a plurality of user equipment-specific reference signals (UE-RSs) from among a plurality of possible sets of subcarriers based on the at least one frequency shift, the plurality of sets of subcarriers being offsent in frequency and non-overlapping; and
transmitting the plurality of UE-RSs on the determined subcarriers on a plurality of layers to at least one UE.

25. The method of claim 24, wherein the subcarriers for the plurality of UE-RSs are determined based on a single frequency shift.

26. The method of claim 25, wherein the at least one UE comprises a plurality of UEs, each UE receiving at least one of the plurality of UE-RSs, and wherein the single frequency shift is used for all of the plurality of UEs.

27. The method of claim 25, wherein
the at least one frequency shift is based on a cell identity (ID).

28. The method of claim 25, further comprising:
configuring the at least one UE with the at least one frequency shift selected from a plurality of possible frequency shifts.

29. The method of claim 24, further comprising:
precoding the plurality of UE-RSs based on at least one precoding vector for the at least one UE; and
transmitting the plurality of UE-RSs, after precoding, on the plurality of layers, one UE-RS on each layer.

30. The method of claim 24, wherein the at least one UE comprises a single UE, and wherein the plurality of UE-RSs are transmitted by a single cell on the determined subcarriers to the single UE for single-user multiple-input multiple-output (SU-MIMO).

31. The method of claim 24, wherein the at least one UE comprises a plurality of UEs, and wherein the plurality of UE-RSs are transmitted by a single cell on the determined subcarriers to the plurality of UEs for multi-user multiple-input multiple-output (MU-MIMO).

32. The method of claim 24, wherein the at least one UE comprises a single UE, and wherein the plurality of UE-RSs are transmitted by a plurality of cells on the determined subcarriers to the single UE for coordinated multi-point (CoMP).

33. The method of claim 24, wherein the at least one UE comprises a plurality of UEs, and wherein the plurality of UE-RSs are transmitted by a plurality of cells to the plurality of UEs for coordinated multi-point (CoMP).

34. The method of claim 24, wherein the at least one UE comprises a plurality of UEs, and wherein the at least one frequency shift comprises a plurality of frequency shifts for the plurality of UEs, each UE having a different frequency shift.

35. The method of claim 24, further comprising:
ascertaining whether or not to use the at least one frequency shift to determine the subcarriers for the plurality of UE-RSs; and
using fixed designated subcarriers for the plurality of UE-RSs if the at least one frequency shift is not used to determine the subcarriers for the plurality of UE-RSs.

36. The method of claim 35, wherein the ascertaining whether or not to use the at least one frequency shift comprises ascertaining whether or not to use the at least one frequency shift based on an identity applicable to a cell transmitting the plurality of UE-RSs.

37. The method of claim 35, wherein the ascertaining whether or not to use the at least one frequency shift comprises ascertaining whether or not to use the at least one frequency shift based on a type of a subframe in which the plurality of UE-RSs are transmitted.

38. The method of claim 24, further comprising:
determining at least one additional subcarrier for the plurality of UE-RSs not based on the at least one frequency shift; and
transmitting the plurality of UE-RSs on the at least one additional subcarrier on the plurality of layers to the at least one UE.

39. The method of claim 38, wherein the plurality of UE-RSs are transmitted on at least one resource block, and wherein the at least one additional subcarrier is located near at least one edge of the at least one resource block.

40. The method of claim 38, wherein the determined subcarriers are evenly spaced across at least one resource block, and wherein the at least one additional subcarrier is not evenly spaced across the at least one resource block.

41. The method of claim 24, wherein the transmitting the plurality of UE-RSs comprises transmitting the plurality of UE-RSs in only a data section of a subframe comprising the data section and a control section.

42. The method of claim 24, wherein the transmitting the plurality of UE-RSs comprises transmitting the plurality of UE-RSs in a data section of a subframe comprising only the data section and no control section.

43. The method of claim 24, wherein two UE-RSs are transmitted on the determined subcarriers on two layers, one UE-RS on each layer.

44. An apparatus for wireless communication, comprising:
means for determining at least one frequency shift;
means for determining a set of subcarriers for a plurality of user equipment-specific refernce signals (UE-RSs) from among a plurality of possible sets of subcarriers based on the at least one frequency shift, the plurality of sets of subcarriers being offset in frequency and non-overlapping; and
means for transmitting the plurality of UE-RSs on the determined subcarriers on a plurality of layers to at least one UE.

45. The apparatus of claim 44, wherein the subcarriers for the plurality of UE-RSs are determined based on a single frequency shift.

46. The apparatus of claim 44, further comprising:
means for precoding the plurality of UE-RSs based on at least one precoding vector for the at least one UE; and
means for transmitting the plurality of UE-RSs, after precoding, on the plurality of layers, one UE-RS on each layer.

47. The apparatus of claim 44, wherein the at least one UE comprises a single UE, and wherein the plurality of UE-RSs are transmitted by a single cell on the determined subcarriers to the single UE for single-user multiple-input multiple-output (SU-MIMO).

48. The apparatus of claim 44, wherein the at least one UE comprises a plurality of UEs, and wherein the plurality of UE-RSs are transmitted by a single cell on the determined subcarriers to the plurality of UEs for multi-user multiple-input multiple-output (MU-MIMO).

49. The apparatus of claim 44, wherein the at least one UE comprises a single UE, and wherein the plurality of UE-RSs are transmitted by a plurality of cells on the determined subcarriers to the single UE for coordinated multi-point (CoMP).

50. The apparatus of claim 44, wherein the at least one UE comprises a plurality of UEs, and wherein the plurality of UE-RSs are transmitted by a plurality of cells to the plurality of UEs for coordinated multi-point (CoMP).

51. A method for wireless communication, comprising:
determining a frequency shift;
determining a set of subcarriers for a user equipment-specific reference signal (UE-RS) from among a plurality of possible sets of subcarriers based on the frequency shift; and
receiving the UE-RS on the determined subcarriers at a UE, wherein the UE-RS is one of a plurality of UE-RSs transmitted on a plurality of layers to at least one UE including the UE, the plurality of sets of subcarriers being offset in frequency and non-overlapping.

52. The method of claim 51, wherein the
frequency shift is based on a cell identity (ID).

53. The method of claim 51, wherein the frequency shift is configured for the UE and is selected from a plurality of possible frequency shifts.

54. The method of claim 51, wherein the at least one UE comprises only the UE, and wherein the plurality of UE-RSs are transmitted by a single cell on the determined subcarriers to the UE for single-user multiple-input multiple-output (SU-MIMO).

55. The method of claim 51, wherein the at least one UE comprises a plurality of UEs including the UE, and wherein the plurality of UE-RSs are transmitted by a single cell on the determined subcarriers to the plurality of UEs for multi-user multiple-input multiple-output (MU-MIMO).

56. The method of claim 51, wherein the at least one UE comprises only the UE, and wherein the plurality of UE-RSs are transmitted by a plurality of cells on the determined subcarriers to the UE for coordinated multi-point (CoMP).

57. The method of claim 51, wherein the at least one UE comprises a plurality of UEs including the UE, and wherein the plurality of UE-RSs are transmitted by a plurality of cells to the plurality of UEs for coordinated multi-point (CoMP).

58. The method of claim 51, further comprising:
ascertaining whether or not to use the at least one frequency shift to determine the subcarriers for the plurality of UE-RSs; and
using fixed designated subcarriers for the plurality of UE-RSs if the at least one frequency shift is not used to determine the subcarriers for the plurality of UE-RSs.

59. The method of claim 51, further comprising:
determining at least one additional subcarrier for the UE-RS not based on the frequency shift; and
receiving the UE-RS further on the at least one additional subcarrier at the UE.

60. The method of claim 51, wherein the receiving the UE-RS comprises;

receiving the UE-RS in only a data section of a subframe comprising the data section and a control section.

61. The method of claim 51, wherein the receiving the UE-RS comprises;
receiving the UE-RS in a data section of a subframe comprising only the data section and no control section.

62. An apparatus for wireless communication, comprising:
means for determining a frequency shift;
means for determining a set of subcarriers for a user equipment-specific reference signal (UE-RS) from among a plurality of possible sets of subcarriers based on the frequency shift; and
means for receiving the UE-RS on the determined subcarriers at a UE, wherein the UE-RS is one of a plurality of UE-RSs transmitted on a plurality of layers to at least one UE including the UE, the plurality of sets of subcarriers being offset in frequency and non-overlapping.

63. The apparatus of claim 62, wherein
the frequency shift is based on a cell identity (ID).

64. A method for wireless communication, comprising:
determining a first set of subcarriers for a first user equipment-specific reference signal (UE-RS) transmitted by a plurality of cells to a first UE for coordinated multi-point (CoMP);
determining a second set of subcarriers for a second UE-RS transmitted by the plurality of cells for a second UE for CoMP;
transmitting the UE-RS on the determined first set of subcarriers to the first UE; and
transmitting the second UE-RS on the second set of subcarriers to the second UE;
wherein the first UE and the second UE are both scheduled for data transmission on at least one resource block, and wherein the first UE-RS and the second UE-RS are transmitted on the at least one resource block.

65. The method of claim 64, wherein the first set of subcarriers for the first UE-RS are fixed designated subcarriers.

66. The method of claim 64, wherein the first set of subcarriers for the first UE-RS are determined based on a frequency shift, the frequency shift being determined based on a cell identity (ID) of a serving cell for the first UE or being configured for the first UE.

67. The method of claim 64, wherein the first UE-RS is transmitted on a single layer to the first UE.

68. An apparatus for wireless communication, comprising:
means for determining a first set of subcarriers for a first user equipment-specific reference signal (UE-RS) transmitted by a plurality of cells to a first UE for coordinated multi-point (CoMP);
means for determining a second set of subcarriers for a second UE-RS transmitted by the plurality of cells for a second UE for CoMP;
means for transmitting the UE-RS on the determined first set of subcarriers to the first UE; and
means for transmitting the second UE-RS on the second set of subcarriers to the second UE;
wherein the first UE and the second UE are both scheduled for data transmission on at least one resource block, and wherein the first UE-RS and the second UE-RS are transmitted on the at least one resource block.

69. The apparatus of claim 68, wherein the first set of subcarriers for the first UE-RS are fixed designated subcarriers.

70. The apparatus of claim 68, wherein the first set of subcarriers for the first UE-RS are determined based on a frequency shift, the frequency shift being determined based on a cell identity (ID) of a serving cell for the first UE or being configured for the first UE.

71. A method for wireless communication, comprising:
determining a first set of subcarriers for a first user equipment-specific reference signal (UE-RS) transmitted by a plurality of cells to a UE for coordinated multi-point (CoMP); and
receiving the first UE-RS on the determined first set of subcarriers at the first UE;
wherein the first UE and a second UE are both scheduled for data transmission on at least one resource block, and wherein the first UE-RS and a second UE-RS are transmitted on the at least one resource block.

72. The method of claim 71, wherein the first set of subcarriers for the first UE-RS are fixed designated subcarriers.

73. The method of claim 71, wherein the first set of subcarriers for the first UE-RS are determined based on a frequency shift, the frequency shift being determined based on a cell identity (ID) of a serving cell for the first UE or being configured for the first UE.

74. An apparatus for wireless communication, comprising:
means for determining a first set of subcarriers for a first user equipment-specific reference signal (UE-RS) transmitted by a plurality of cells to a UE for coordinated multi-point (CoMP); and
means for receiving the first UE-RS on the determined first set of subcarriers at the first UE;
wherein the first UE and a second UE are both scheduled for data transmission on at least one resource block, and wherein the first UE-RS and a second UE-RS are transmitted on the at least one resource block.

75. The apparatus of claim 74, wherein the first set of subcarriers for the first UE-RS are fixed designated subcarriers.

76. The apparatus of claim 74, wherein the first set of subcarriers for the first UE-RS are determined based on a frequency shift, the frequency shift being determined based on a cell identity (ID) of a serving cell for the first UE or being configured for the first UE.

* * * * *